(12) United States Patent
Matsumoto

(10) Patent No.: US 7,424,140 B2
(45) Date of Patent: Sep. 9, 2008

(54) METHOD, COMPUTER PROGRAM PRODUCT, AND APPARATUS FOR PERFORMING RENDERING

(75) Inventor: Kazuhiko Matsumoto, Tokyo (JP)

(73) Assignee: Ziosoft Inc. (JP)

( * ) Notice: Subject to any disclaimer, the term of this patent is extended or adjusted under 35 U.S.C. 154(b) by 763 days.

(21) Appl. No.: 11/070,684

(22) Filed: Mar. 2, 2005

(65) Prior Publication Data

US 2006/0056730 A1   Mar. 16, 2006

(30) Foreign Application Priority Data

Aug. 24, 2004   (JP)   ............... 2004-243996

(51) Int. Cl.
 *A61B 6/00*   (2006.01)
(52) U.S. Cl. ............... 382/128; 382/131; 378/8
(58) Field of Classification Search ................ 382/128, 382/131; 378/8
See application file for complete search history.

(56) References Cited

U.S. PATENT DOCUMENTS

| 5,734,384 | A | * | 3/1998 | Yanof et al. ................ 345/424 |
| 6,212,420 | B1 | * | 4/2001 | Wang et al. ................ 382/128 |
| 2007/0270682 | A1 | * | 11/2007 | Huang et al. ............... 600/410 |

FOREIGN PATENT DOCUMENTS

| JP | 2000-051207 | 2/2000 |
| JP | 2000-276550 | 10/2000 |

OTHER PUBLICATIONS

"Virtual Colon Unfolding," appearing in the United States publication, IEEE Visualization (2001, p. 411-420), by Vilanova Bartroli et al.
Office Action dated May 22, 2007 issued in corresponding Japanese Patent Application No. 2004-243996.
Prior Art Information List containing a concise explanation of the relevance of the cited references.

* cited by examiner

*Primary Examiner*—David V Bruce
(74) *Attorney, Agent, or Firm*—Caesar, Rivise, Bernstein, Cohen & Pokotilow, Ltd.

(57) ABSTRACT

A rendering method for generating relation information of image data of three or more dimensions. The rendering method includes preparing an exfoliated picture generated by projecting voxels using cylindrical projection method with a center line, preparing position data of a cross-section and a cross-section image representing the cross-section of the image data, creating a hypothetical cylinder including position data using the center line, calculating relation information associating the hypothetical cylinder and the cross-section using position data of the hypothetical cylinder and position data of the cross-section, and synthesizing the relation information with at least one of the exfoliated picture and the cross-section image to generate a synthesized image.

38 Claims, 14 Drawing Sheets

METHOD, COMPUTER PROGRAM PRODUCT, AND APPARATUS FOR PERFORMING RENDERING

BACKGROUND OF THE INVENTION

The present invention relates to a method, computer program product, and apparatus for performing rendering.

Conventionally, medical image information relating to organs created by medical imaging devices, such as x-ray devices, computer tomography (CT) devices, magnetic resonance imaging (MRI) devices, and the like, are used in performing medical procedures such as medical diagnostics and treatment. Medical image information is processed to obtain an image which can be displayed three-dimensionally, and the image is viewed three-dimensionally for the purpose of diagnosis or treatment. For example, there are three-dimensional display methods as described below for displaying images of tubular organs among organs such as blood vessels, trachea, and digestive tract.

One such method is the parallel projective method which externally renders a tubular organ with parallel rays, and projects the tubular organ onto a two-dimensional plane. As shown in FIG. 1, a parallel projection image P1 created by the parallel projective method is suited for viewing a tubular organ from the outside. However, the user cannot view the interior of the tubular organ in the parallel projection image P1. The perspective projective method, for example, can be used for viewing the interior of a tubular organ. In the perspective projective method, an image of the interior of a tubular organ, rendered by rays radially radiated from a viewpoint set within the tubular organ, is projected onto a two-dimensional plane. The perspective projective image P2 shown in FIG. 2, for example, can be created by the perspective projective method. The perspective projective image P2 can be used as a virtual endoscope so as to display an image of the interior side of tubular organs just as if viewed through an endoscope. A user can view the inside of the tubular organ using the perspective projective image P2. However, when a user does not closely examine the entirety of the interior circumference of the tubular organ, there is concern a polyp or the like may be overlooked. Furthermore, it is difficult to see the back side of folds present in tubular organs in the perspective projective image P2.

An article by Vilanova Bartroli et al., "Virtual Colon Unfolding," appearing in the United States publication, IEEE Visualization (2001, p. 411-420), describes an exfoliated picture display in which a tubular organ is projected onto a cylindrical projection surface virtually disposed around a tubular organ by the cylindrical projection method or the curved cylindrical projection method. The projection image is sliced from the side of the cylindrical surface so as to be exfoliated on a two-dimensional surface. An exfoliated picture P3, such as that shown in FIG. 3, is created by the exfoliated picture display. In the exfoliated picture P3, polyps and the like can be readily discovered since the inner wall surface of the tubular organ can be viewed on a two-dimensional surface.

For example, a cross-section of human tissue may be displayed by several different types of display methods using volume rendering. In this case, a user may compare various cross-sectional images for diagnosis. For example, a perspective projective image P2 showing a section of a human body including a tubular organ may be created, and an exfoliated picture P3 of the tubular organ displayed in the perspective projective image P2 may be created. The user may perform a medical examination using the perspective projective image P2 and exfoliated picture P3 displayed side by side. However, it is difficult to understand which location of the exfoliated picture P3 the perspective projective image P2, which is a cross-section image, corresponds to. Thus, it is difficult to associate the perspective projective image P2 with the exfoliated picture P3. For example, it is difficult to comprehend where a position in the cross-section observed in the perspective projective image P3 is located on the exfoliated picture P3, and conversely, it is difficult to comprehend where a position observed on the exfoliated picture P3 is located in the perspective projective image P2.

SUMMARY OF THE INVENTION

The present invention provides a method, computer program product, and apparatus for rendering to generate relation information of three-dimensional image data.

One aspect of the present invention is a method for performing rendering using image data of three or more dimensions including a plurality of voxels of three or more dimensions. The method includes preparing an exfoliated picture generated by projecting voxels using cylindrical projection method with a center line, preparing position data of a cross-section and a cross-section image representing the cross-section of the image data, creating a hypothetical cylinder including position data using the center line, calculating relation information associating the hypothetical cylinder and the cross-section using position data of the hypothetical cylinder and position data of the cross-section, and synthesizing the relation information with at least one of the exfoliated picture and the cross-section image to generate a synthesized image.

Another aspect of the present invention is a method for performing rendering using image data of three or more dimensions including a plurality of voxels of three or more dimensions. The method includes preparing an exfoliated picture generated by projecting voxels using cylindrical projection method with a center line, preparing a cross-section image representing a cross-section of the image data, creating a hypothetical cylinder that intersects the cross-section using the center line, calculating relation information representing the position of the cross-section using position data of voxels existing in an intersection of the cross-section and the hypothetical cylinder, and synthesizing the relation information and the exfoliated picture to generate a synthesized image.

A further aspect of the present invention is a method for performing rendering using image data of three or more dimensions including a plurality of voxels of three or more dimensions. The voxels include position data. The method includes preparing an exfoliated picture generated by projecting voxels using cylindrical projection method with a center line, preparing a cross-section image representing a cross-section of the image data, creating a hypothetical cylinder that intersects the cross-section using the plurality of voxels, calculating relation information representing the position of several voxels on the cross-section image using the position data of voxels existing in an intersection of the cross-section with at least one of the hypothetical cylinder and center line of the hypothetical cylinder, and synthesizing the relation information and cross-section image to generate a synthesized image.

Another aspect of the present invention is a computer readable program product comprising computer readable media storing program code for performing rendering using image data of three or more dimensions including a plurality of voxels of three or more dimensions. The program code when executed by at least one computer performs steps including preparing an exfoliated picture generated by projecting voxels using cylindrical projection method with a center line, preparing position data of a cross-section and a cross-section image representing the cross-section of the image data, creating a hypothetical cylinder including position data using the center line, calculating relation information associating the hypothetical cylinder and the cross-section using position data of the hypothetical cylinder and position data of the cross-section, and synthesizing the relation information with at least one of the exfoliated picture and the cross-section image to generate a synthesized image.

A further aspect of the present invention is a computer readable program product comprising computer readable media storing program code for performing rendering using image data of three or more dimensions including a plurality of voxels of three or more dimensions. The program code when executed by at least one computer performs steps including preparing an exfoliated picture generated by projecting voxels using cylindrical projection method with a center line, preparing a cross-section image representing a cross-section of the image data, creating a hypothetical cylinder that intersects the cross-section using the center line, calculating relation information representing the position of the cross-section using position data of voxels existing in an intersection of the cross-section and the hypothetical cylinder, and synthesizing the relation information and the exfoliated picture to generate a synthesized image.

Another aspect of the present invention is a computer readable program product comprising computer readable media storing program code for performing rendering using image data of three or more dimensions including a plurality of voxels of three or more dimensions. The voxels include position data. The program code when executed by at least one computer performs steps including preparing an exfoliated picture generated by projecting voxels using cylindrical projection method with a center line, preparing a cross-section image representing a cross-section of the image data, creating a hypothetical cylinder that intersects the cross-section using the plurality of voxels, calculating relation information representing the position of several voxels on the cross-section image using the position data of voxels existing in an intersection of the cross-section with at least one of the hypothetical cylinder and center line of the hypothetical cylinder, and synthesizing the relation information and cross-section image to generate a synthesized image.

A further aspect of the present invention is an apparatus for performing rendering using image data of three or more dimensions including a plurality of voxels of three or more dimensions. An exfoliated picture is generated by projecting voxels using cylindrical projection method with a center line. A cross-section image represents a cross-section of the image data. The apparatus includes a hypothetical cylinder generation unit for creating a hypothetical cylinder including position data using the center line. A relation information calculation unit calculates relation information associating the hypothetical cylinder and the cross-section using position data of the cross-section and position data of the hypothetical cylinder. A synthesis unit synthesizes the relation information with at least one of the exfoliated picture and cross-section image to generate a synthesized image.

Another aspect of the present invention is an apparatus for performing rendering using image data of three or more dimensions including a plurality of voxels of three or more dimensions. Each of the voxels includes position data. An exfoliated picture is generated by projecting voxels using cylindrical projection method with a center line. A cross-section image represents a cross-section of the image data. The apparatus includes a hypothetical cylinder generation unit for creating a hypothetical cylinder that intersects the cross-section using the center line. A relation information calculation unit calculates relation information representing a position on the cross-section image using the position data of voxels existing in an intersection of the cross-section and the hypothetical cylinder. A synthesis unit synthesizes the relation information and exfoliated picture to generate a synthesized image.

A further aspect of the present invention is an apparatus for performing rendering using image data of three or more dimensions including a plurality of voxels of three or more dimensions. The voxels include position data. An exfoliated picture is generated by projecting voxels using cylindrical projection method with a center line. A cross-section image represents a cross-section of the image data. The apparatus includes a hypothetical cylinder generation unit for creating a hypothetical cylinder using several voxels. A relation information calculation unit calculates relation information representing the position of voxels on the cross-section image using the position data of the voxels existing in an intersection of the cross-section with at least one of the hypothetical cylinder and a center line of the hypothetical cylinder. A synthesis unit synthesizes the relation information and cross-section image.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
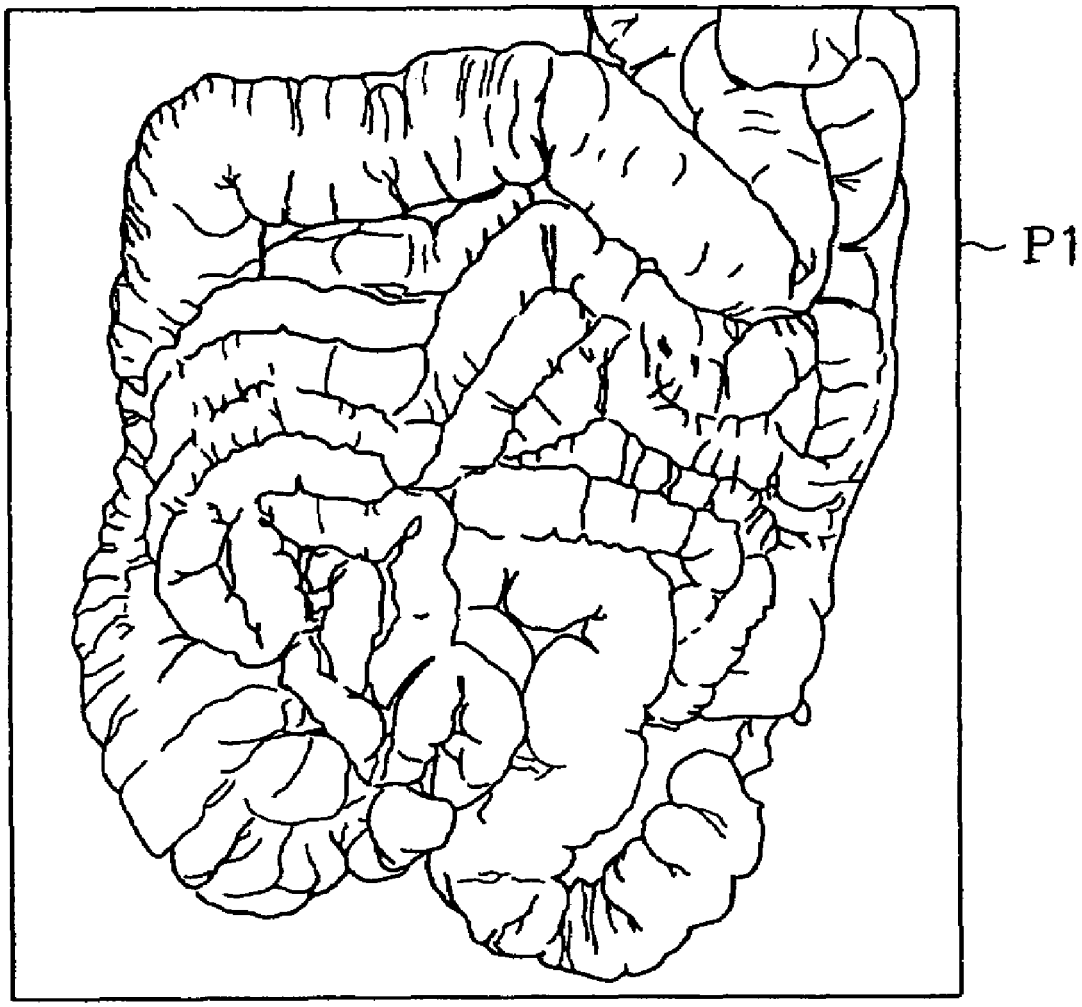
FIG. 1 shows a projection image of a tubular organ created by the parallel projective method.
Figure 2:
FIG. 2 is a schematic diagram showing a projection image of a tubular organ created by the perspective projective method.
Figure 3:
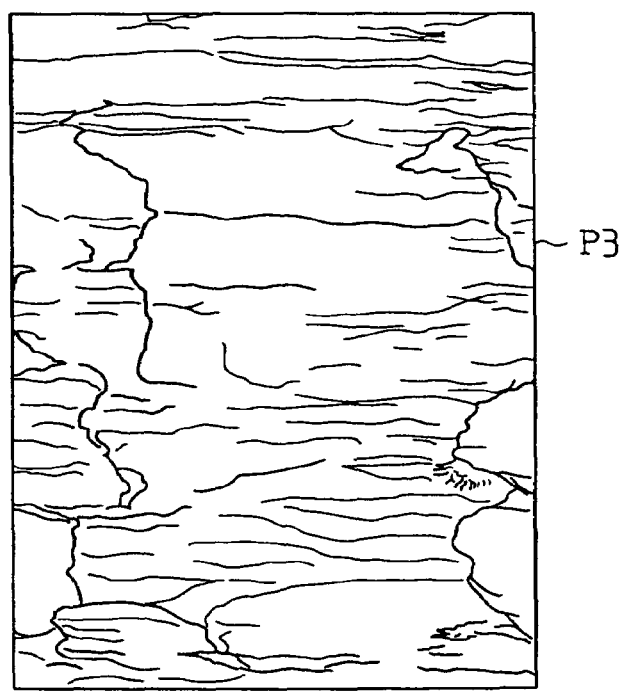
FIG. 3 is schematic diagram showing an exfoliated picture of a tubular organ.

In the drawings, like numerals are used for like elements throughout.

First Embodiment

An image display device 1 according to a first embodiment of the present invention is described hereinafter with reference to FIGS. 4 through 14.

Figure 4:
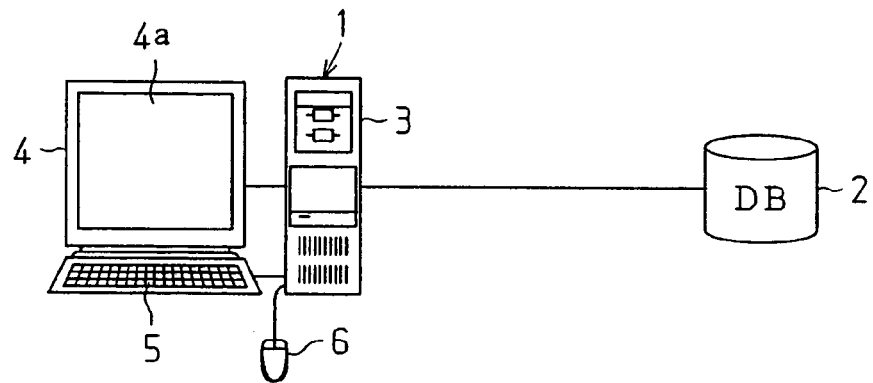
FIG. 4 is a schematic diagram showing the structure of an image display device according to a first embodiment of the present invention.

As shown in FIG. 4, the image display device 1 is connected to a database 2. The database 2 stores, for example, CT image data acquired by a computerized tomography (CT) image projection device. The image display device 1 reads CT image data from the database 2, generates various types of images used for diagnosis and treatment, and displays these images on a screen. Although the image display device 1 of the first embodiment uses CT image data, the image data used by the image display device is not limited to CT image data. Usable image data includes data obtained by medical image processing devices such as CT, positron emission tomography (PET), and magnetic resonance imaging (MRI). Furthermore, data which combines such data, or data generated by processing such data also may be used.

The image display device 1 is provided with a computer 3 (workstation or personal computer), monitor 4, and input devices such as a keyboard 5 and a mouse 6. The computer 3 is connected to the database 2.

Figure 5:
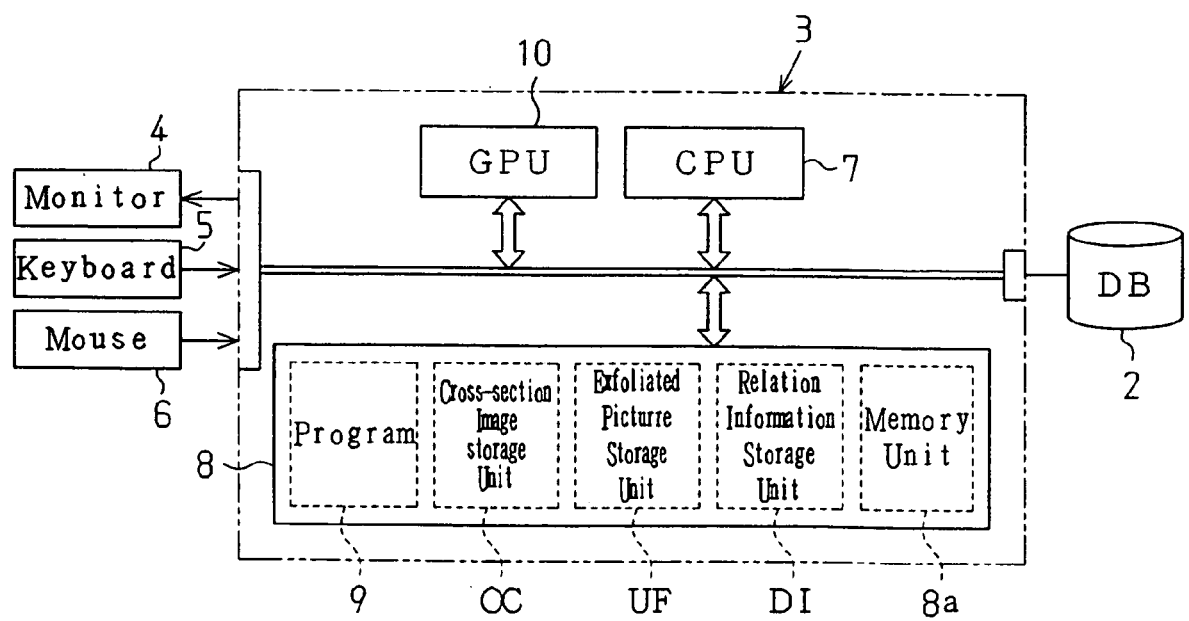
FIG. 5 is a schematic block diagram showing the structure of the image display device of FIG. 4.

FIG. 5 schematically shows the structure of the image display device 1. The computer 3 includes a central processing unit (CPU) 7 and a memory 8 provided with a hard disk. The image display device 1 reads CT image data from the database 2 or the hard disk, and acquires voxel data from the CT image data. The memory 8 stores a program 9 (application software) for executing an exfoliated picture projection process. The memory 8 is provided with a memory unit 8a for temporarily storing the voxel data acquired from the CT image data. The memory unit 8a stores the center line CP which represents the center of the tubular tissue T, as shown in FIG. 9A. Furthermore, the memory 8 is provided with a cross-section image storage unit OC which stores image data of the cross-section image (original cross-section image OR1 shown in FIG. 12) of a human including tubular tissue T. The memory 8 is further provided with an exfoliated picture storage unit UF, which stores image data of the exfoliated image of the tubular tissue T (the original exfoliated picture UR1 shown in FIG. 21 and the new exfoliated picture UP1 shown in FIG. 13), and a relation information storage unit DI, which stores relation information.

The CPU 7 calculates and outputs relation information of the exfoliated picture of the tubular tissue T by executing the program 9 using the voxel data obtained from the CT image data in the database 2 (rendering process). That is, in the first embodiment, the CPU 7 (computer 3) executes the rendering program of the rendering process (hypothetical cylinder creating stage, relation information calculation stage, synthesis stage, output stage). Accordingly, the computer 3 functions as a hypothetical cylinder creation unit, a relation information calculation unit, and a synthesis unit.

Figure 12:
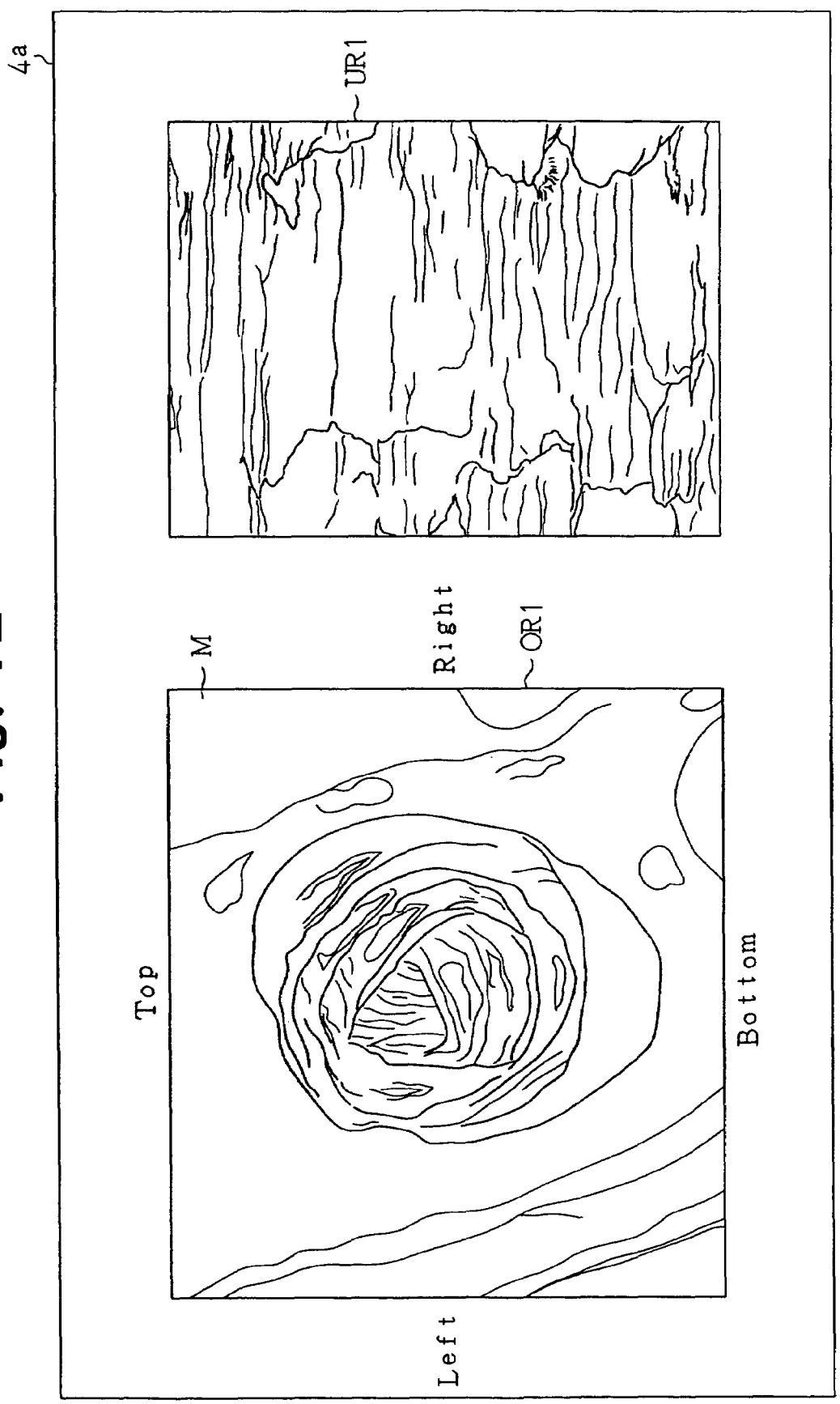
FIG. 12 is a schematic diagram showing an original cross-section image and original exfoliated picture.
Figure 13:
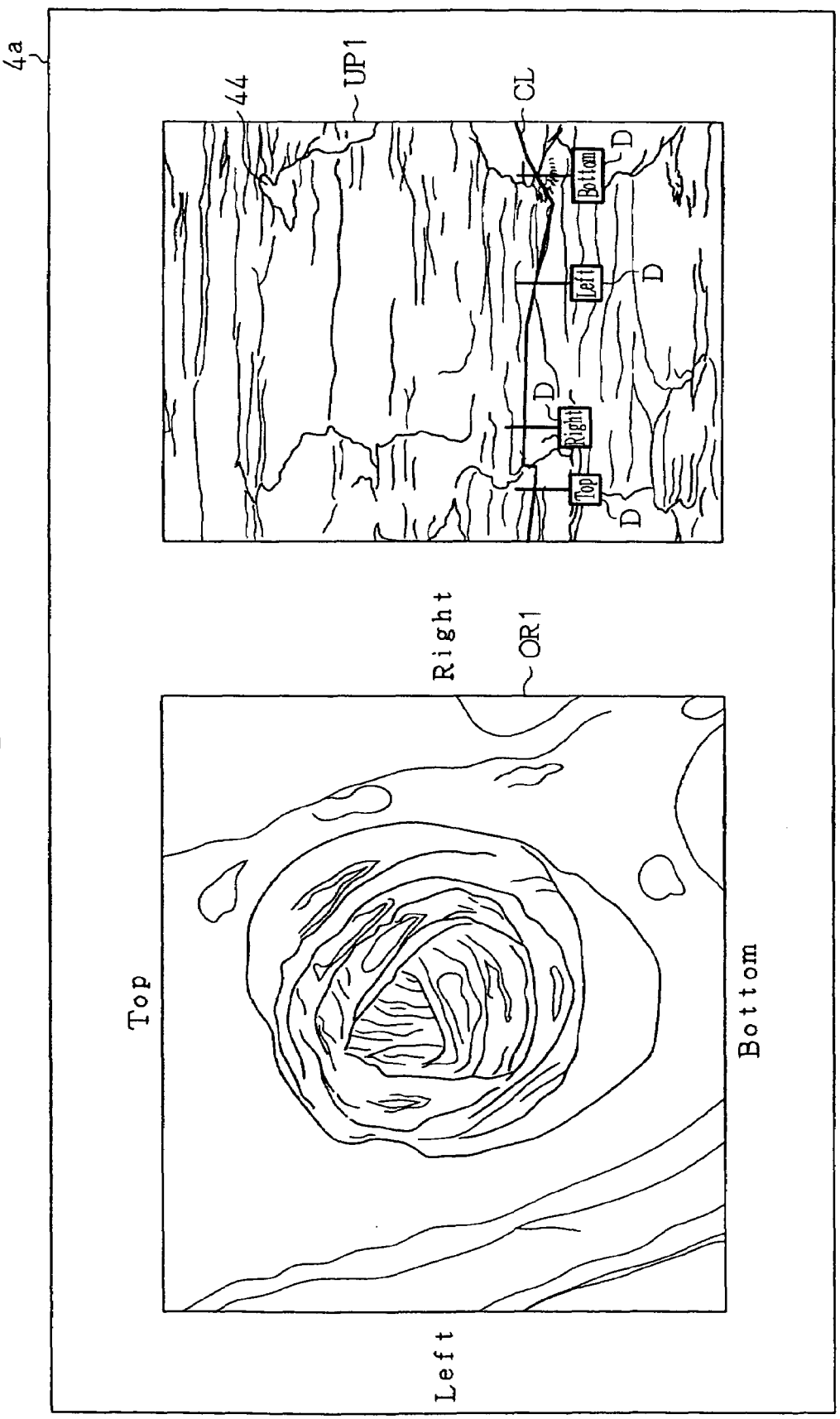
FIG. 13 is a schematic diagram showing a new exfoliated picture.

As shown in FIG. 12, the original exfoliated picture UR1, that is, the image before the rendering process has been executed, is displayed side by side with the original cross-section image OR1 on the monitor 4 (screen 4a). Furthermore, as shown in FIG. 13, a new exfoliated picture UP1, that is, the image after the rendering process has been executed, is displayed side by side with the original cross-section image OR1 on the monitor 4 (screen 4a).

Figure 6:
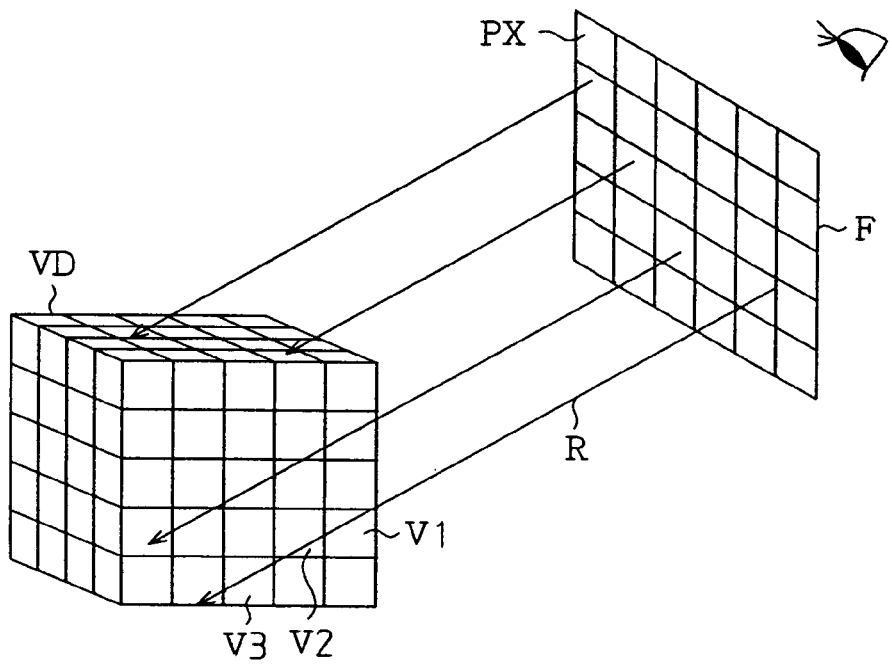
FIG. 6 is a diagram illustrating volume rendering.

As shown in FIG. 6, the voxel data VD as image data of three or more dimensions is a collection of voxels (elements of three or more dimensions) which are three-dimensional pixels of cubic bodies. A voxel may be a cube, a block, a hexahedron, or a twisted hexahedron. A density value is allocated as a voxel value to a three-dimensional grid point. In the first embodiment, the voxel values of the CT image data, that is, the CT values, are set as density values.

The CT image data are obtained by cross-section imaging of the body of a patient. The CT image data includes a plurality of slices (cross-sections). Individual slices of the CT image data are two-dimensional cross-section images of bone, blood vessels, internal organs and the like. CT image data including a plurality of adjacent slices are obtained in the cross-section imaging. Accordingly, the CT image data is three-dimensional image data including a plurality of slices.

The CT image data has different CT values for different tissues of the subject (bone, blood vessel, organs and the like). CT values are x-ray attenuation coefficients using water as a standard. For example, the type of tissue or lesion can be determined based on the CT value. Furthermore, the CT value also includes all coordinate data of the cross-section image (slice image) of the body scanned by the CT imaging device. The positional relationships between different tissues in the line of sight (depth direction) are discriminated from the coordinate data. In this way the voxel data VD includes CT values (hereinafter referred to as "voxel values") and coordinate data.

Tubular tissue T includes, for example, blood vessels, trachea, and digestive organs (esophagus, stomach, small intestines, and colon). In the first embodiment, the colon is used in the examples. Tubular tissue also includes tubular structures other than the organs of blood vessels, trachea, alimentary canal, and the like.

The original cross-section image OR1 is a cross-section image of a human or the like including tubular tissue T created by a three-dimensional image projection method, such as volume rendering or the like. In the original cross-section image OR1, any cross-section of the three-dimensional image data is displayed in accordance with the observation position and observation target. As shown in FIG. 12, in the original cross-section image OR1, perspective projective image of the tubular tissue T and an image of the planar cross-section of tissue M surrounding the tubular tissue T are synthesized to facilitate understanding of the correspondence between the tubular tissue T and the surrounding tissue M. As a result, the user may refer to the original cross-section image OR1 to comprehend the conditions in the interior of the tubular tissue T, and understand the relationship between the tubular tissue T and the surrounding tissue M.

The original exfoliated picture UR1 is an image generated by projecting the internal wall plane of the tubular tissue T displayed in the original cross-section image OR1 onto a two-dimensional plane. In the first embodiment, the original exfoliated picture UR1 is generated by the cylindrical projection method using a cylindrical coordinate system, or another type of projection method such as, for example, the curved cylindrical projection method, in the volume rendering process.

The volume rendering process will now be described. Volume rendering typically uses ray casting. In ray casting, the path of light is considered to be radiating from the observation side (frame F side), as shown in FIG. 6. First, the light rays (rays R) are radiated from pixels PX on the frame F. The reflected light is calculated at the position at which each ray R travels every fixed distance (in FIG. 6, the reference symbols V1, V2, V3, . . . correspond to each voxel at each sampling position of the rays R). When a ray sampling position is not present on the grid, the voxel value at that position is calculated by an interpolation process using the voxel values of the voxels surrounding the destination position.

When one ray R is radiated from the frame F toward the voxel data VD, the ray R hits the voxel data VD. Part of the ray R is reflected by the voxel, or absorbed by the voxel, and the remaining part of the ray R passes through the voxel. The part of the ray R that passes through the voxel is repeatedly reflected, absorbed, and transmitted in a similar manner. Then, the absorbed light and reflected light are calculated discretely for each voxel, and the reflected light is computed. A two-dimensional image is generated by calculating the pixel values of an image projected onto a frame F using this computation.

Figure 7:
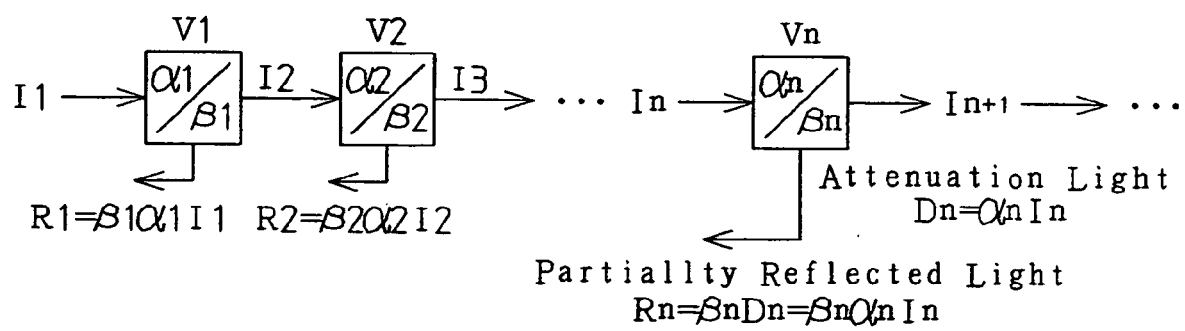
FIG. 7 is a diagram illustrating a process for volume rendering.

FIG. 7 illustrates the calculation method used in ray casting of the single ray R in FIG. 6. The blocks in FIG. 7 represent voxels. Each voxel has a parameter of non-transparency (opacity value) $\alpha n$, and a shading coefficient $\beta n$ as optical property coefficients derived from voxel value. The opacity value $\alpha n$ satisfies the expression $0 \leq \alpha n \leq 1$, and the value $(1-\alpha n)$ represents transparency. A value of opacity $\alpha n=1$ corresponds to full opacity, $\alpha n=0$ corresponds to transparency, and $0<n<1$ corresponds to semi-transparency. The shading coefficient possesses information relating to shading such as gradient and the like.

Initial incidence light (light ray) I1 sequentially passes through each voxel and its residual light (transmission light) is gradually attenuated via partial reflection and absorption by each voxel. The integrated value (integrated reflection light) of the partial reflected light Rn (n=1, 2, . . . ) in each voxel is equivalent to the intensity of the pixel PX in the frame F. Since the attenuation light Dn (n=1, 2, . . . ) is represented by the equation $Dn=\alpha n In$ using the incidence light In of the $n^{th}$ voxel, the partially reflected light Rn can be expressed by the equation $Rn=\beta n Dn=\beta n \alpha n In$. The equation $In+1=(1-\alpha n)In$ is obtained from the relational equations of the residual light (transmission light) and incidence light in each voxel. Therefore, the pixel value Pv which is the integrated reflection light can be expressed by the following equation.

$$Pv=\beta 1\alpha 1 I1+\beta 2\alpha 2 I2+ \ldots +\beta n\alpha n In=\Sigma \beta i \alpha i Ii$$

Each voxel value is associated with an opacity value $\alpha n$, and the opacity value $\alpha n$ is obtained from the voxel value based on the association. For example, when a volume rendering image of the colon is created, the colon is displayed by associating an opacity value [1] with the voxel value corresponding to the colon, and associating an opacity value [0] with other voxel values.

Figure 8A:
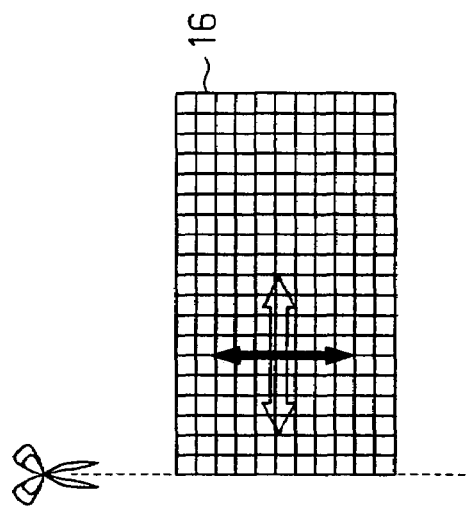
FIGS. 8A to 8C are diagrams illustrating a cylindrical projection method.
Figure 8B:
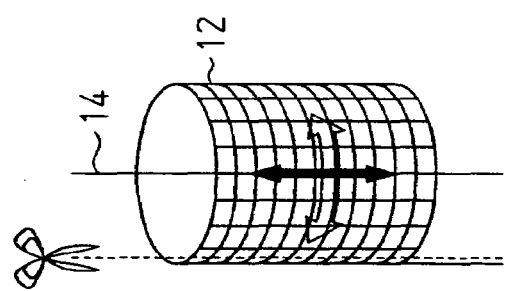
Figure 8C:
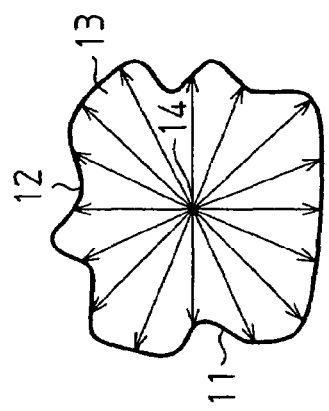

FIGS. 8A through 8C show the process for creating an original exfoliated picture UR1 of tubular tissue T by the cylindrical projection method using voxel data.

In the cylindrical projection method, as shown in FIG. 8A, a cylindrical coordinate system is hypothesized, and it is assumed that viewpoints are distributed continuously on a center axis 14 (direction perpendicular to the plane of the drawing) of a cylindrical projection surface 12 (refer to FIG. 8B) arranged so as to enclose a projection subject 11. Rays R are radially radiated from these viewpoints within a plane 13 perpendicular to the center axis of the cylindrical projection surface within the interior of the projection subject 11, such that the projection subject is projected onto the cylindrical projection surface 12, as shown in FIG. 8B. An original exfoliated picture UR1, which displays the interior of the tubular tissue T, is obtained as shown in FIG. 12 by coordinate conversion of the projection image projected on the cylindrical projection surface 12 to a two-dimensional plane (projection plane) 16, as shown in FIG. 8C.

In general, a tubular tissue is curved. When the entirety of the curved tubular tissue is projected on a cylindrical projection surface, separate parts of the tubular tissue mutually overlap. The curved cylindrical projection method is used in order to project tubular tissue without overlaps.

Figure 9C:
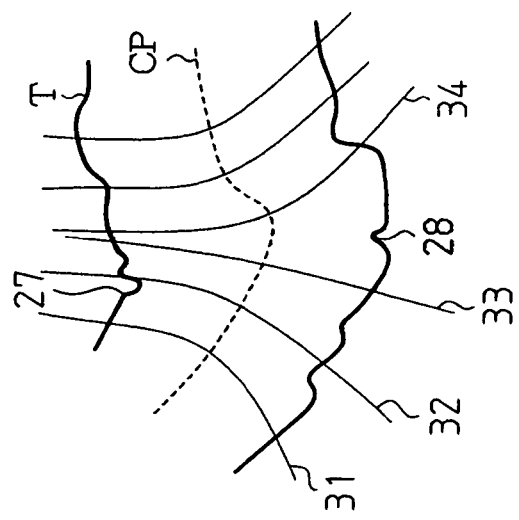
FIGS. 9A to 9C are diagrams illustrating a curved cylindrical projection method.
Figure 9B:
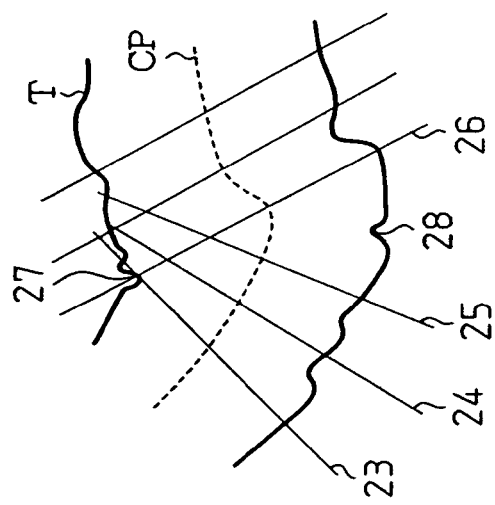
Figure 9A:
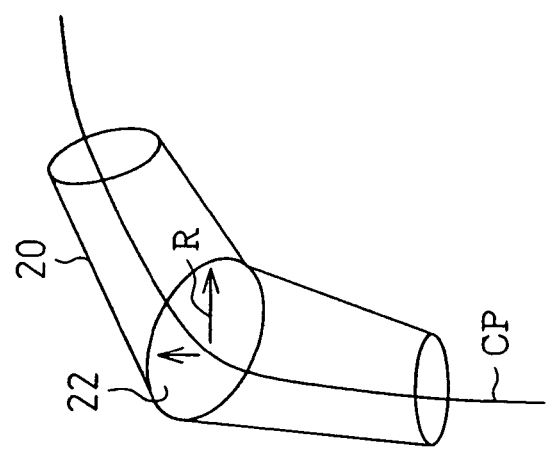

FIGS. 9A through 9C show the process of creating an original exfoliated picture UR1 of tubular tissue T by the curved cylindrical projection method using voxel data.

The curved cylindrical projection method assumes a center line CP along the center line of the tubular tissue 20 (tubular body), as shown in FIG. 9A. Viewpoints are assumed to be continuously distributed on this center line CP. Rays R radiate within planes (FIG. 9A only shows one plane 22), which are perpendicular to the center line CP, and a projection subject is projected on a cylindrical projection surface (not shown), which encloses the exterior side of the projection subject. An original exfoliated picture UR1, which displays the interior of the tubular tissue, is obtained as if having cut open the cylindrical projection surface, as shown in FIG. 12, by subjecting the projection object projected on the cylindrical projection surface to coordinate conversion to a two-dimensional plane. In this way, a satisfactory original exfoliated picture UR1 of the curved tubular tissue T is created by bending the center line CP so as to conform to the curvature of the tubular tissue 20, and shortening the interplanar distance perpendicular to the center line CP.

In the curved cylindrical projection method, when the tubular tissue 20 has a large curvature, the planes 23, 24, and 25 that are perpendicular to the center line CP intersect the plane 26, as shown in FIG. 9B. As a result, in the interior wall surface of the tubular tissue T, some areas are displayed multiple times, or some parts are not displayed at all in the original exfoliated picture UR1. For example, the polyp 27 is projected by planes 24 and 26, and therefore displayed twice in the original exfoliated picture UR1. There is no plane to project the polyp 28, however. Accordingly, the polyp 28 is not even displayed once on the original exfoliated picture UR1 despite its presence in the tubular tissue 20. In order to avoid such an occurrence, non-linear ray casting is performed.

Non-linear ray casting radiates rays R from the center line CP in the curved cylindrical projection method, as shown in FIG. 9C. Specifically, the rays R do not radiate within a plane perpendicular to the center line CP, but rather radiate within curved planes 31 through 36, which are perpendicular to the center line CP. The non-linear rays R radiate within the curved planes 31 through 36 from the center line CP. In this way, only one plane projects a single point on the polyp 27, such that the polyp 27 is displayed only once in the original exfoliated picture UR1. The polyp 28 can be projected on the original exfoliated picture UR1 by increasing the number of planes intersecting the center line CP.

Relation information represents position of the original cross-section image OR1, that is, the cross-section of the tubular tissue T, on the new exfoliated picture UP1 displayed on the monitor 4 (screen 4a) in FIG. 13. Relation information is provided with an intersection line CL (refer to FIG. 13) representing the cross-section position of the original cross-section image OR1 and a direction caption D (refer to FIG. 13) representing the direction in the original cross-section image OR1.

Figure 10:
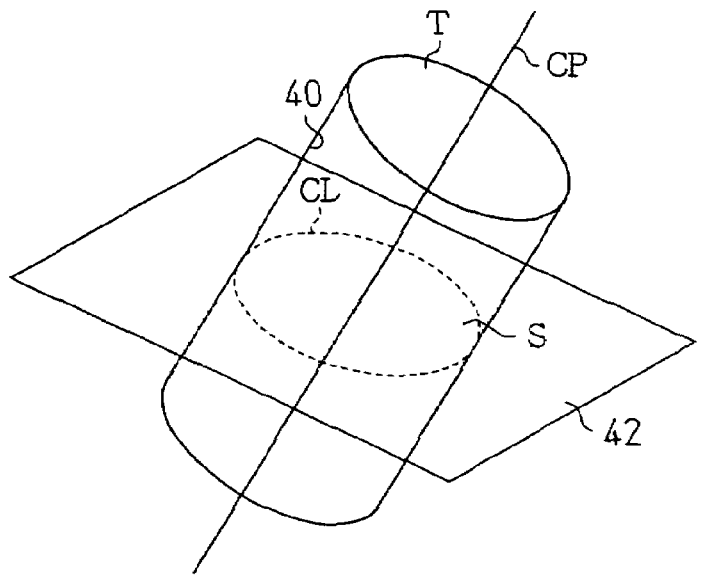
FIG. 10 is a schematic diagram showing relation information.

As shown in FIG. 10, the intersection line CL is an intersection line of the original cross-section image OR1 (cross-section 42) and a hypothetical cylinder 40. Specifically, tissue including a cross-section S of the tubular tissue T is projected (constructed) on the cross-section 42, which is a cross-sectional plane creating the original cross-section image OR1. The tubular tissue T is projected on the hypothetical cylinder 40, the hypothetical cylinder 40 (tubular tissue T) and the cross-section 42 intersect at the cross-section S, and the circular circumference of the cross-section S forms the intersection line CL of the hypothetical cylinder 40 and the cross-section 42. That is, the intersection line CL is common to both the hypothetical cylinder 40 (tubular tissue T) and the cross-section 42. As shown in FIG. 13, the intersection line CL is displayed on the new exfoliated picture UP1 as relation information. Accordingly, the user easily comprehends the position of the cross-section 42 in the new exfoliated picture UP1. As a result, the new exfoliated picture UP1 may be associated with the original cross-section image OR1. The hypothetical cylinder 40 and the cross-section 42 have three-dimensional coordinates as position data. The intersection line CL is computed from the three-dimensional coordinates of the hypothetical cylinder 40 and the cross-section 42, and stored in the relation information storage unit DI.

The hypothetical cylinder 40 has the center line CP (center axis of the cylindrical projection surface) serving as a center, for example, with a radius of constant value specified by the application using the rendering program. In the cylindrical projection method and curved cylindrical projection method, the cylindrical projection surface enclosing the tubular tissue T is hypothetical. Rays R radiate for an infinite distance from the center line CP toward the cylindrical projection surface, and the radius of the cylindrical projection surface is infinite. Accordingly, there is no intersection line between the cylindrical projection surface and the cross-section 42. In the first embodiment, the hypothetical cylinder 40 is generated and positioned to be concentric with the cylindrical projection surface, and the intersection line CL is computed as relation information using the hypothetical cylinder 40 and the original cross-section image OR1 (cross-section 42).

The direction caption D indicates the direction in the original cross-section image OR1. As shown in FIG. 13, for example, direction captions D representing top, bottom, left, and right in the original cross-section image OR1 are shown in the new exfoliated picture UR1. The user may readily comprehend the direction in the original cross-section image OR1 on the new exfoliated picture UR1 by means of the direction captions D. Top, bottom, left, and right three-dimensional coordinates in the original cross-section image OR1 are calculated, and images representing the top, bottom, left, and right are stored in the relation information storage unit DI as direction captions D together with the three-dimensional coordinates.

As shown in FIG. 5, the computer 3 is provided with a graphics processing unit (GPU) 10. The GPU 10 is a graphics controller chip, which mainly supports high performance three-dimensional graphics functions and which performs high-speed two-dimensional and three-dimensional graphics drawing functions based on user specified programs. In the first embodiment, post processing is executed by the GPU 10. In this way, the time required for displaying relation information and is reduced.

In post processing, color, contrast, and brightness are corrected to display the calculated relation information on an output device such as the monitor 4. Since the output (for example, a CT image, MRI image) of many medical diagnostic devices is 12-bit gradient data, a new exfoliated picture UP1, which includes the relation information calculated by the rendering process, also is 12-bit gradient data. However, the monitor 4 of the computer 3 and the like often represent RGB colors as 8-bit data. Therefore, color, contrast, and brightness are converted for the monitor 4 by a window level (WL) transformation and color look-up table (LUT) transformation. Image data are also converted for display on the monitor 4 by aligning the size of the image to the screen using affine transformation.

The rendering process performed by the image display device 1 will now be described.

In the first embodiment, the original exfoliated picture UR1 exfoliated by the exfoliated picture calculation process, that is, the curved cylindrical projection method, is stored in the exfoliated picture storage unit UF of the memory 8. The original cross-section image OR1 is stored in the cross-section image storage unit OC. Since the processes for computing the original cross-section image OR1 and original exfoliated picture UR1 are accomplished by well known methods, a detailed description of the process will not be given. The relation information displayed on the new exfoliated picture UP1 is computed by the rendering process.

Figure 11:
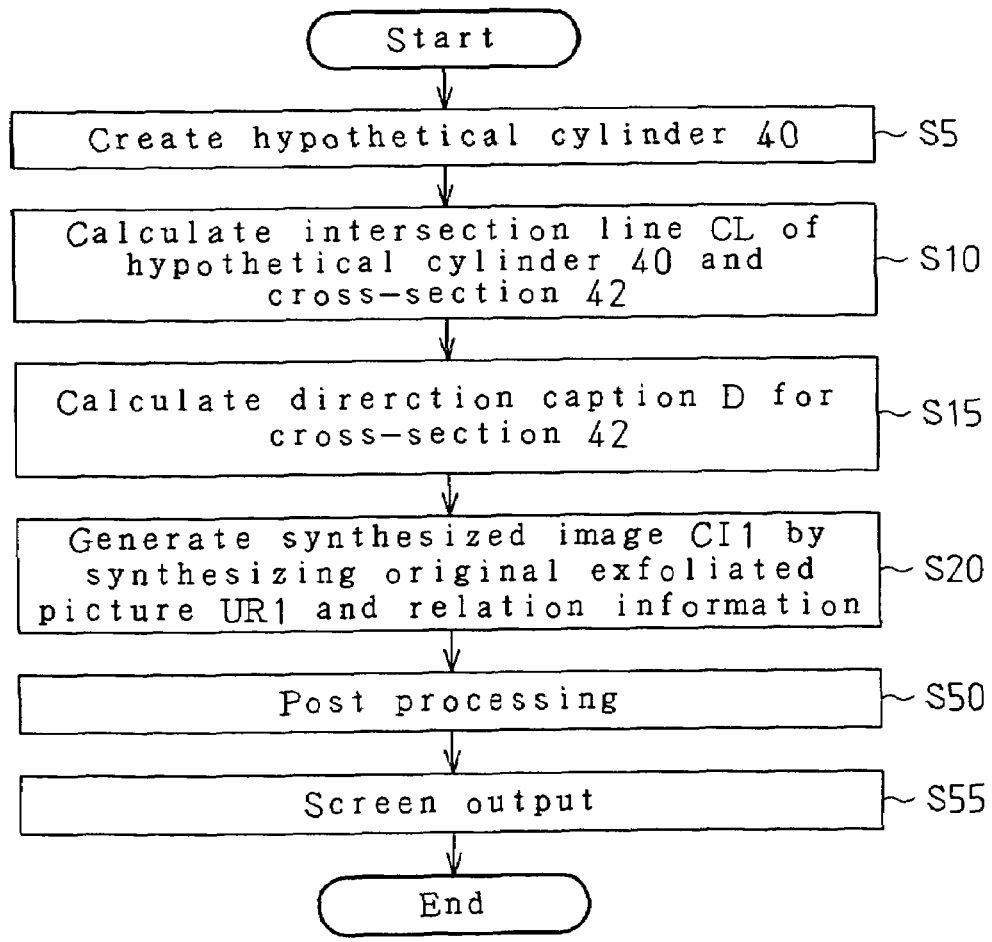
FIG. 11 is a flowchart illustrating rendering.

FIG. 11 is a flowchart showing the entire rendering process.

First, the CPU 7 creates the hypothetical cylinder 40 (step S5). That is, the CPU 7 generates a hypothetical cylinder 40 which has a constant value radius specified by the application and a center line CP serving as a center, and stores the hypothetical cylinder 40 in the memory unit 8a. Then, the CPU 7 computes the intersection line CL of the hypothetical cylinder 40 and the cross-section 42 (step S10), and stores the computed intersection line CL as relation information in the relation information storage unit DI. Next, the CPU 7 computes the direction captions D in the cross-section 42 (step S15), and stores the computed direction captions D as relation information in the relation information storage unit DI.

The CPU 7 reads the original exfoliated picture UR1 from the exfoliated picture storage unit UF, and then reads the intersection line CL and direction captions D from the relation information storage unit DI. The CPU 7 synthesizes the original exfoliated picture UR1 and the relation information (intersection line CL, and direction captions D) to generate a synthesized image CI1, which includes the intersection line CL and direction captions D as overlays displayed on the original exfoliated picture UR1 (step S20).

The synthesized image CI1 is subjected to post processing by the GPU 10, to generate a new exfoliated picture UP1 (refer to FIG. 13) (step S50). When post processing ends, the original cross-section image OR1 and new exfoliated picture UP1 are output side by side to the screen 4a of the monitor 4

(step S55). As shown in FIG. 13, relation information, that is, the intersection line CL and direction captions D, are appended to the new exfoliated picture UP1 after the rendering process ends. Accordingly, the user can readily view the internal wall surface of the tubular tissue T, and the viewing position and viewing direction are associated with the original cross-section image OR1.

More specifically, the intersection line CL indicates where the cross-section of the tubular tissue T displayed in the original cross-section image OR1 is associated to in the new exfoliated picture UP1. Therefore, the user can intuitively understand the correspondence between the original cross-section image OR1 and the new exfoliated picture UP1. The direction captions D indicate top, bottom, left, and right directions in the original cross-section image OR1. Therefore, the user can intuitively comprehend the directions in the original cross-section image OR1 on the new exfoliated picture UP1.

The user may estimate the viewing position using the new exfoliated picture UP1 with displayed relation information. Specifically, when, for example, a polyp 44 is displayed in the new exfoliated picture UP1, as shown in FIG. 13, the user may estimate in which cross-section the polyp 44 can be observed in the original cross-section image OR1. As a result, the user can quickly specify the position for viewing in the original cross-section image OR1, and display that position on the screen 4a of the monitor 4.

The image display device 1 of the first embodiment has the advantages described below.

(1) The relation information for associating the original exfoliated picture UR1 of the tubular tissue T, which is exfoliated by the curved cylindrical projection method, with the original cross-section image OR1, which is displayed in any cross-section (cross-section 42) of the three-dimensional image data, is represented as an intersection line CL. That is, where the cross-section of the tubular tissue T displayed in the original cross-section image OR1 is associated to on the original exfoliated picture UR1 is displayed by the intersection line CL on the new exfoliated picture UP1. Accordingly, the user can intuitively understand the correspondence between the original cross-section image OR1 and the new exfoliated picture UP1. For example, when the user displays the original cross-section image OR1 and the new exfoliated picture UP1 side by side for examination, the original cross-section image OR1 and the new exfoliated picture UP1 may readily be associated with each other. Accordingly, the user may specify the viewing position and viewing direction in the exfoliated picture.

(2) The direction captions D which indicate the top, bottom, left, and right directions in the original cross-section image OR1 are displayed in the new exfoliated picture UP1. Accordingly, the user can intuitively comprehend the direction in the original cross-section image OR1 on the new exfoliated picture UP1.

(3) Relation information for associating any cross-section (cross-section 42) of the three-dimensional image data is displayed in the new exfoliated picture UP1. Consequently, the user may easily view the internal wall surface of the tubular tissue T and intuitively understand the viewing direction and viewing position in association with the original cross-section image OR1.

(4) The CPU 7 computes the relation information from the coordinates of the intersection line CL where the hypothetical cylinder 40 and cross-section 42 intersect, and the coordinates indicating the directions in the original cross-section image OR1. Accordingly, the relation information associating the new exfoliated picture UP1 and the original cross-section image OR1 is computed by a simple calculation.

Second Embodiment

Figure 14:
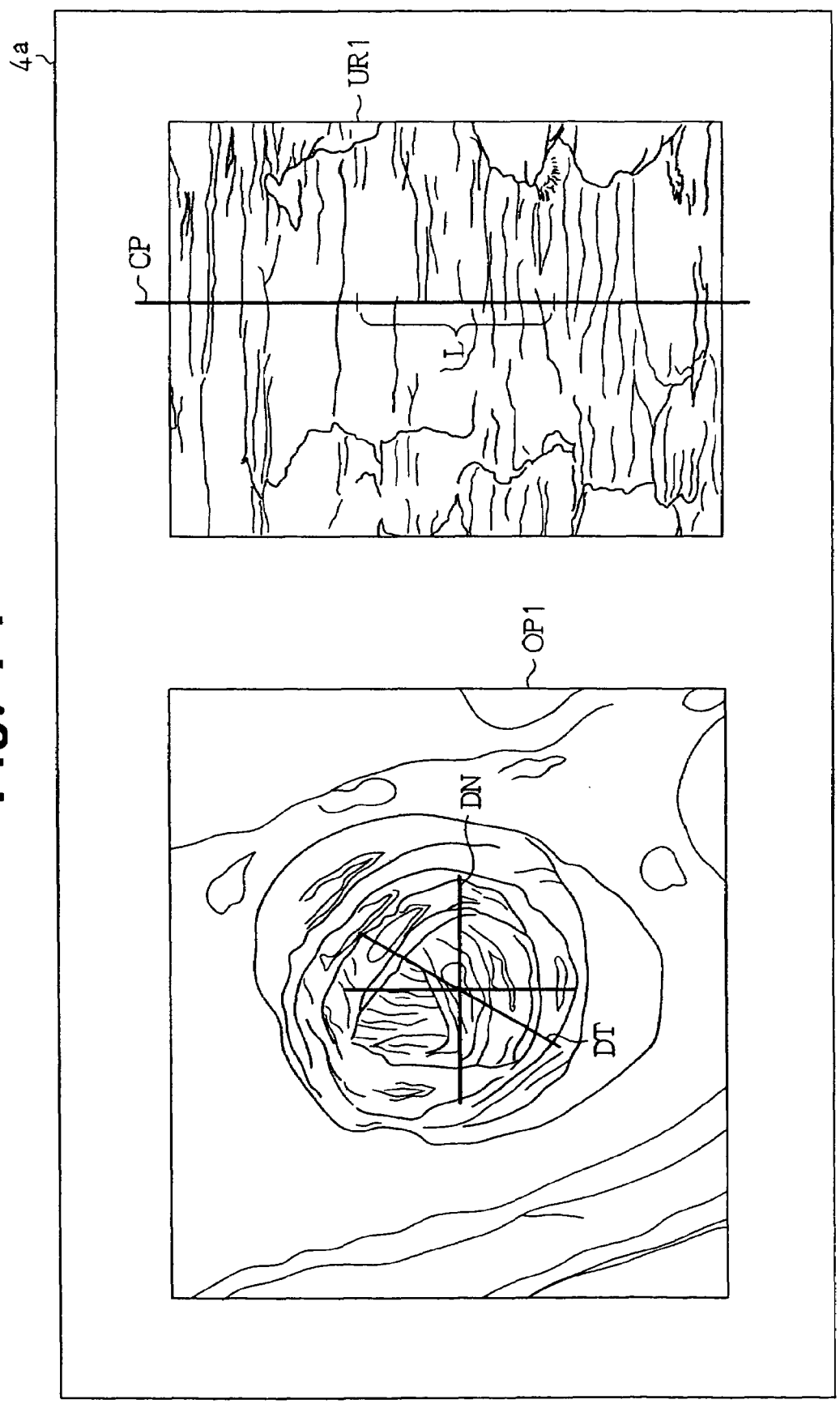
FIG. 14 is a schematic diagram showing a new cross-section image according to a second embodiment of the present invention.

An image display device 1 according to a second embodiment of the present invention will now be described with reference to FIGS. 14 to 16. One feature of the second embodiment is in that relation information, which specifies tubular tissue T represented as an original exfoliated picture UR1 in an cross-section 42, is displayed on a new cross-section image OP1 (refer to FIG. 14). In the second embodiment, the image data of the new cross-section image OP1 generated by the CPU 7 and GPU 10 are stored in a cross-section image storage unit OC of the memory 8 in order to realize the new cross-section image OP1 shown in FIG. 14.

Figure 15:
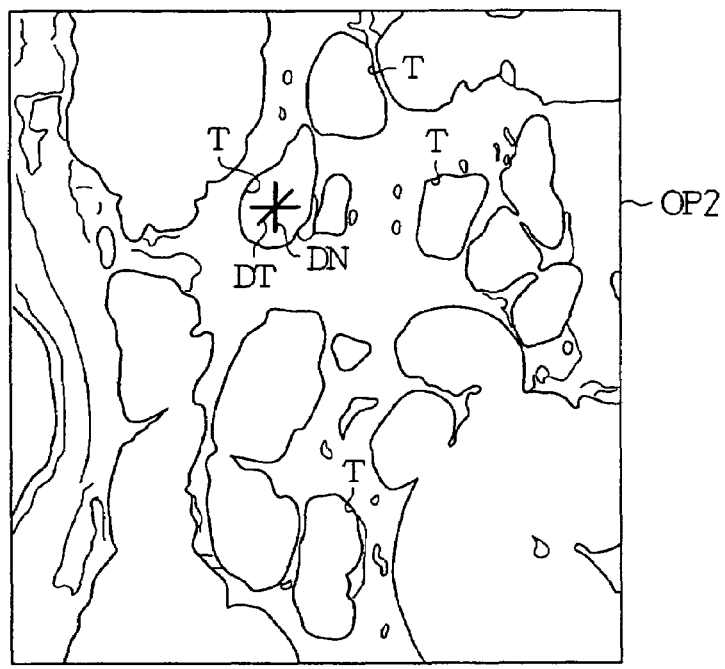
FIG. 15 is schematic diagram showing a new exfoliated picture.
Figure 16:
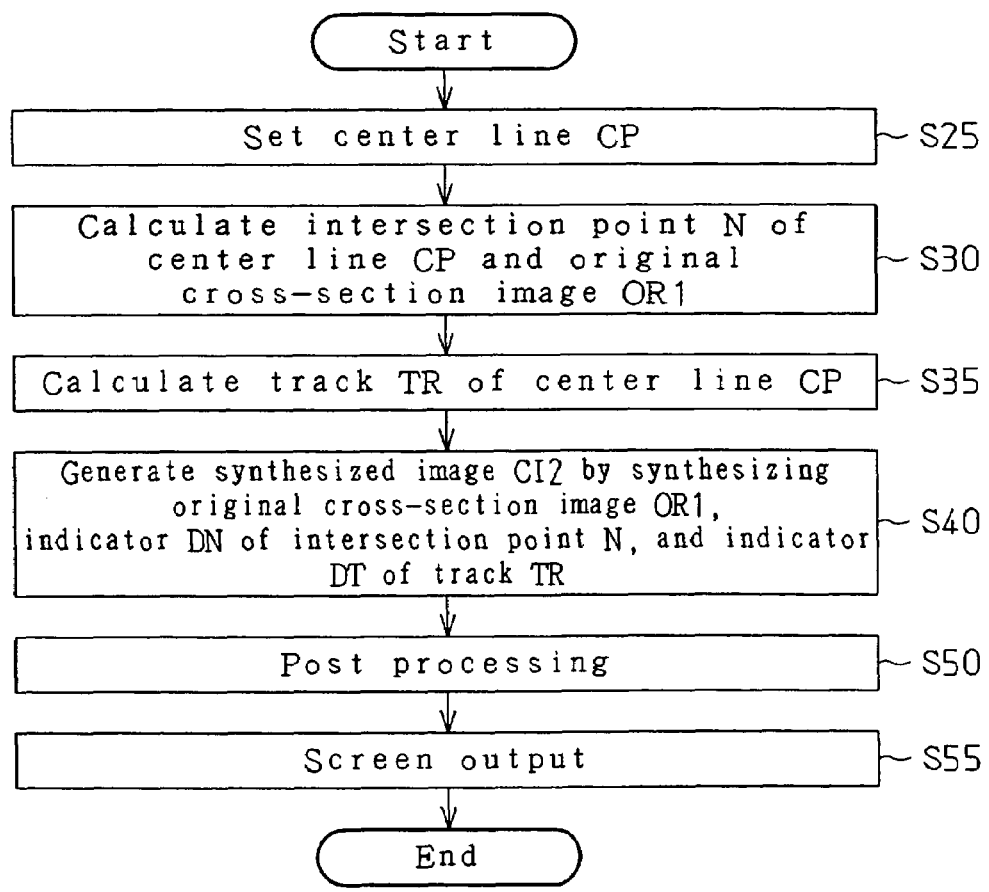
FIG. 16 is a flowchart illustrating rendering.

For example, a plurality of tubular tissues T may be displayed on a new cross-section image OP2, as shown in FIG. 15. In this case, the image display device 1 displays relation information linked to the original exfoliated picture UR1 within the new cross-section image OP1 displayed on the screen 4a of the monitor 4, as shown in FIG. 14, such that the user comprehends which tubular tissue T is displayed in the original exfoliated picture UR1.

The relation information is provided with intersection point N and track TR. In the new cross-section image OP1, the intersection point N is displayed as a cross line indicator DN and the track TR is displayed as indicator DT. Specifically, the intersection point N on the new cross-section image OP1 is the intersection point of the center line CP of the tubular tissue T and the cross-section 42 (refer to FIG. 10). The center line CP in the hypothetical cylinder 40 (refer to FIG. 14) is set at the center line of the tubular tissue T displayed in the original exfoliated picture UR1. As shown in FIG. 14, the intersection point of the center line CP and the cross-section 42 is displayed in the new cross-section image OP1 as intersection point N (cross line indicator DN). The center line CP and cross-section 42 have three-dimensional coordinates, respectively. The intersection point N is computed based on the three-dimensional coordinates, and an image of the cross line indicator DN representing the intersection point N is formed. The image of the cross line indicator DN is stored in the relation information storage unit DI as relation information together with the three-dimensional coordinates.

In the new cross-section image OP1, the track TR indicates the direction in which the tubular tissue T extends. As shown in FIG. 14, for example, the track TR (indicator DT) of the center line CP of the hypothetical cylinder 40 is displayed on the cross-section 42, that is, on the new cross-section image OP1. The center line CP has three-dimensional coordinates. Only the three-dimensional coordinates corresponding to a predetermined length L on the center line CP are calculated, and the image of the indicator DT corresponding to the track TR of this length L is stored in the relation information storage unit DI as relation information together with the three-dimensional coordinates.

The rendering process will now be discussed. FIG. 16 is a flowchart illustrating the entire rendering process.

In the second embodiment, the original exfoliated picture UR1 exfoliated by the curved cylindrical projection method is stored beforehand in the exfoliated picture storage unit UF in the same manner as in the first embodiment. The original cross-section image OR1 is stored in the cross-section image storage unit OC. First, the CPU 7 sets the center line CP of the tubular tissue T (hypothetical cylinder 40) (step S25). Then, the CPU 7 computes the intersection point N of the center line CP and the cross-section (original cross-section image OR1) (step S30), and computes the track TR of the center line CP (step S35). The CPU 7 synthesizes the indicator DN of the intersection point N, the indicator DT of the track TR, and the original cross-section image OR1 to generate a synthesized image CI2 (step S40).

The synthesized image CI2 is subjected to post processing by the GPU 10 to generate a new cross-section image OP1 (step S50). When post processing ends, the new cross-section image OP1 and original exfoliated picture UR1 are output side by side to the screen 4a of the monitor 4 (step S55). As shown in FIG. 14, in the new cross-section image OP1, the center line CP and the indicator DN of the intersection point N are displayed on the original cross-section image OR1 (refer to FIG. 12). Therefore, the user intuitively comprehends how the original exfoliated picture UR1 displayed on screen 4a corresponds to the tubular tissue T even when a plurality of tubular tissues T are displayed on the new cross-section image OP2, as shown in FIG. 15. Since the indicator DT of the track TR is displayed on the new cross-section image OP1, the user can intuitively understand the direction in which the tubular tissue T displayed as the original exfoliated picture UR1 extends on the new cross-section image OP1.

The image display device 1 of the second embodiment has the advantages described below.

(1) The indicator DN of the intersection point N is displayed on the new cross-section image OP1. Accordingly, the user can easily and intuitively understand which tubular tissue T among a plurality of tubular tissues T is represented by the displayed original exfoliated picture UR1 linked to the new cross-section image OP1 on the screen 4a even when a plurality of tubular tissues T are displayed on the new cross-section image OP1.

(2) The indicator DT of the track TR of the center line CP is displayed on the new cross-section image OP1. Accordingly, the user can intuitively understand the direction in which the tubular tissue T, which corresponds to the displayed original exfoliated picture UR1 linked with the new cross-section image OP1 on the screen 4a, extends on the new cross-section image OP1 even when a plurality of tubular tissues T are displayed on the new cross-section image OP1.

(3) The image display device 1 generates a new cross-section image OP1 which displays relation information (indicator DN of the intersection point N, and indicator DT of the track TR) for associating the original exfoliated picture UR1. Consequently, the user specifies the position and longitudinal direction of the tubular tissue T, and intuitively comprehends the association of the new cross-section image OP1 and the original exfoliated picture UR1 even when the new cross-section image OP1 displayed on the screen 4a includes a plurality of tubular tissues T.

(4) The CPU 7 computes relation information from the coordinates of the intersection point N, which marks the intersection of the center line CP of the hypothetical cylinder 40 and the cross-section (original cross-section image OR1), and the coordinates of the center line CP. Accordingly, the CPU 7 is capable of computing relation information for associating the original exfoliated picture UR1 and the new cross-section image OP1 by a simple calculation.

Third Embodiment

In the first and second embodiments, a single computer 3, such as a workstation or the like, independently executes the exfoliated picture projection process. Alternatively, in the third embodiment, at least one process among the plurality of processes included in the exfoliated picture projection process is distributed to and executed by a plurality of computers.

Figure 17:
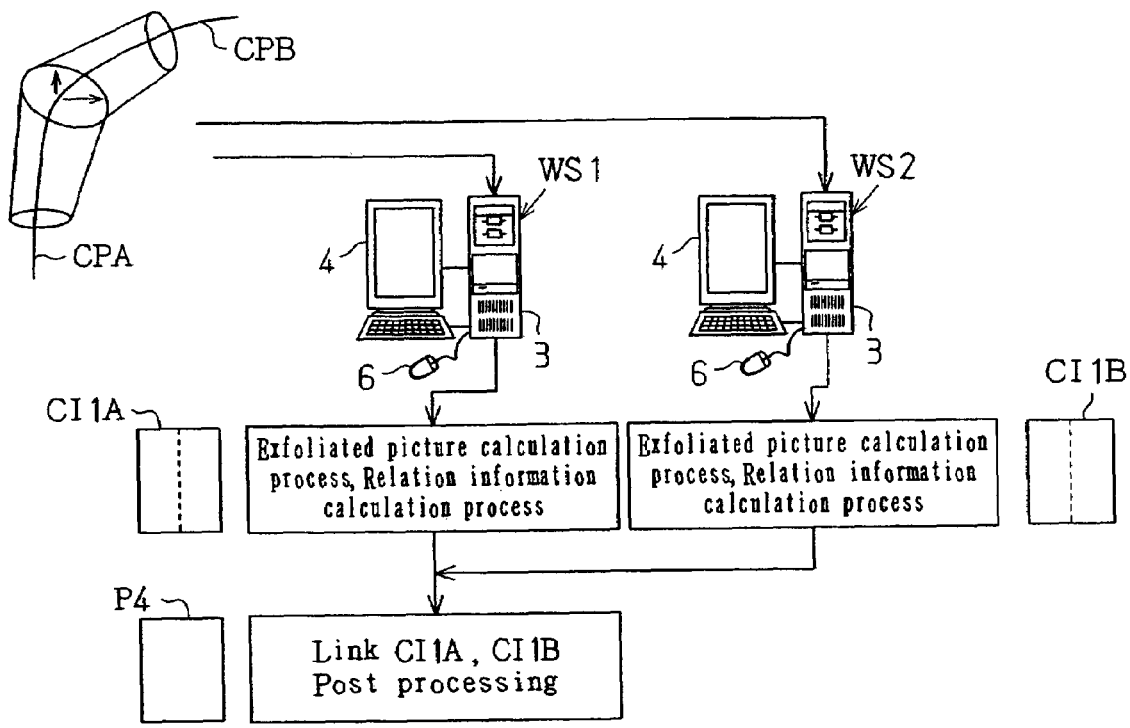
FIG. 17 is a block diagram of a distributed processing in rendering in a first example according to a third embodiment of the present invention.
Figure 18:
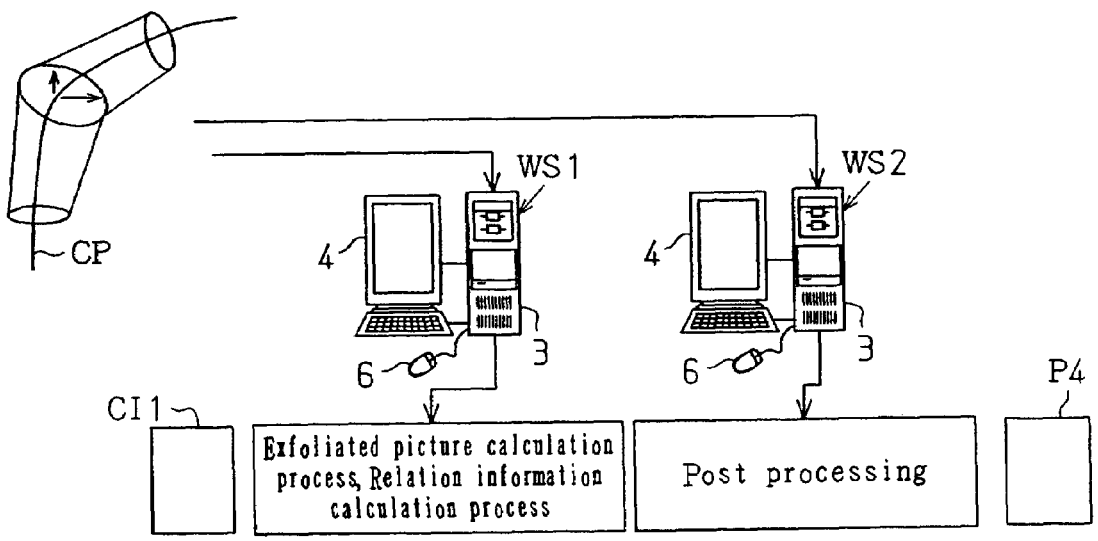
FIG. 18 is a block diagram of the distributed processing in rendering in a second example of the third embodiment of the present invention.
Figure 19:
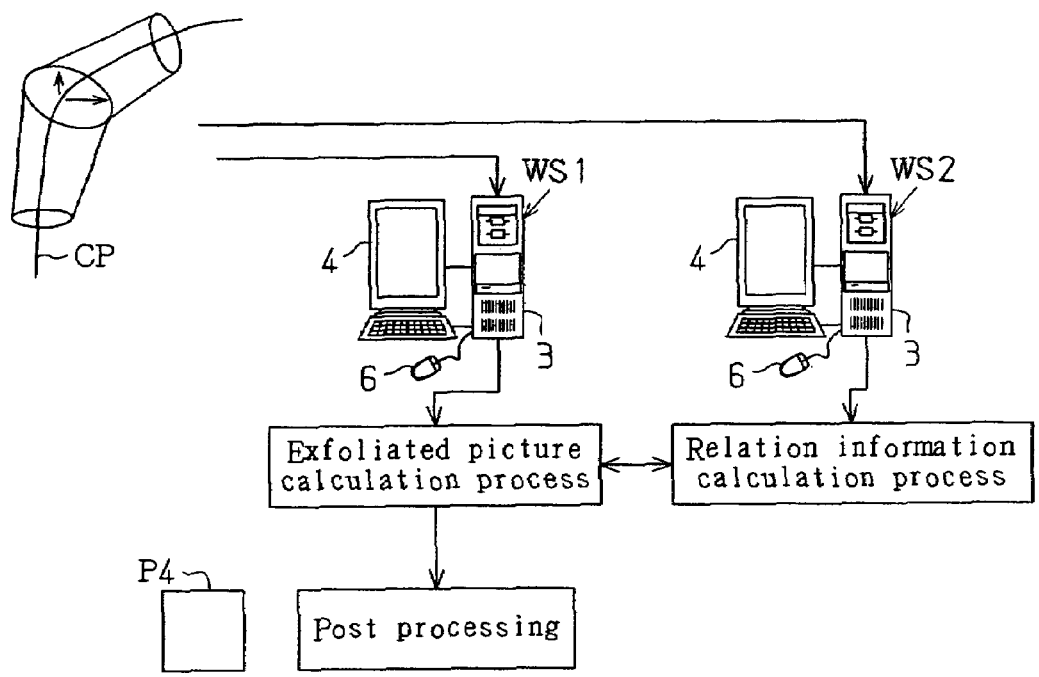
FIG. 19 is a block diagram of the distributed processing in rendering in a third example of the third embodiment of the present invention.

For example, in an in-hospital network such as PACS (picture archiving and communication system), to which a plurality of workstations are connected, at least one process may be distributed to a plurality of workstations to execute the process. Described below are three examples of the distributed execution of the exfoliated picture projection process. In a first example, the length of the center line CP is divided. In the second example, only the post processing is distributed after the exfoliated picture projection process. In the third example, the exfoliated picture calculation process and the relation information calculation process are separated. To facilitate the following discussion, the examples are discussed in terms of two workstations WS1 and WS2 creating a 512×512 image, as shown in FIGS. 17 through 19. Alternatively, the process of creating the image may be distributed to three or more workstations. In the third embodiment, one of the workstations WS1 and WS2 is provided with a GPU 10.

EXAMPLE 1

In example 1, the center line CP is divided into a center line CPA and a center line CPB, as shown in FIG. 17. In this case, each workstation WS1 and WS2 performs the exfoliated picture calculation process and relation information calculation process. In this configuration, the memory resource and transfer resource of the exfoliated picture storage unit UF and the relation information storage unit DI of each workstation requires only one half the entire exfoliated picture. The processing sequence is described below.

(1-1) The workstation WS1 executes the exfoliated picture calculation process and relation information calculation process for rays radiating from the center line CPA. Then, the workstation WS1 stores the calculated exfoliated picture in the exfoliated picture storage unit UF, and stores the calculated relation information in the relation information storage unit DI. Similarly, the workstation WS2 executes the exfoliated picture calculation process and relation information calculation process for rays radiating from the center line CPB. Then, the workstation WS2 stores the calculated exfoliated picture in the exfoliated picture storage unit UF, and stores the calculated relation information in the relation information storage unit DI.

(1-2) The workstation WS2 synthesizes the exfoliated picture and the relation information stored in the exfoliated picture storage unit UF and the relation information storage unit DI to generate a synthesized image CI1B. The workstation WS2 then transmits the synthesized image CI1B to the workstation WS1. The size of the transfer at this time is 512×256.

(1-3) The workstation WS1 synthesizes the exfoliated picture and the relation information stored in the exfoliated picture storage unit UF and the relation information storage unit DI to generate a synthesized image CI1A. Then, the workstation WS1 synthesizes the synthesized image CI1A, which it generated, with the synthesized image CI1B generated by the workstation WS2 to generate a synthesized image CI1. The workstation WS1 performs post processing on the synthesized image CI1 to obtain a new exfoliated picture UP1, which includes visualized relation information.

EXAMPLE 2

In example 2, only the post processing is separated from the exfoliated picture projection process. As shown in FIG. 18, all of the voxel data VD is subjected to the exfoliated picture calculation process and the relation information calculation process by the workstation WS1. Post processing is executed by the workstation WS2 which is provided with a GPU 10 suited for high-speed image processing. In this configuration, the time required for post processing is reduced. The processing sequence is described below.

(2-1) The workstation WS1 subjects the voxel data VD to the exfoliated picture calculation process and the relation information calculation process. Then, the workstation WS1 stores the calculated original exfoliated picture UR1 in the exfoliated picture storage unit UF, and stores the calculated relation information in the relation information storage unit DI.

(2-2) The workstation WS1 synthesizes the original exfoliated picture UR1 and the relation information stored in the exfoliated picture storage unit UF and the relation information storage unit DI to generate a synthesized image CI1, and transmits the synthesized image CI1 to the workstation WS2. The size of the transfer at this time is 512×512.

(2-3) The workstation WS2 subjects the synthesized image CI1 to post processing to obtain a new exfoliated picture UP1, which includes visualized relation information.

EXAMPLE 3

In example 3, the exfoliated picture calculation process and relation information calculation process are divided. As shown in FIG. 19, data is transferred a multiple number of times between the workstations WS1 and WS2. However, the overall processing speed is improved since the exfoliated picture calculation process and the relation information calculation process are executed in parallel.

(3-1) The workstation WS1 subjects the voxel data VD to the exfoliated picture calculation process. Then, when the original exfoliated picture UR1 is calculated for each cross-section, the workstation WS1 transmits the original exfoliated pictures UR1 to the workstation WS2. Each original exfoliated picture UR1 is stored in the exfoliated picture storage unit UF of the workstation WS2.

(3-2) While the workstation WS1 executes the exfoliated picture calculation process, the workstation WS2 executes the relation information calculation process. The workstation WS2 synthesizes the original exfoliated picture UR1 and the relation information to generate a synthesized image CI1 for each cross-section after the exfoliated picture calculation process and relation information calculation process have ended.

(3-3) When a synthesized image CI1 corresponding to all of the voxel data VD is generated, the workstation WS2 transmits the synthesized image CI1 to the workstation WS1. Then, the workstation WS1 subjects the synthesized image CI1 to post processing to obtain a new exfoliated picture UP1, which includes visualized relation information. The overall processing speed is improved since the post processing is executed by the workstation WS2, which is provided with a GPU 10 suited for high-speed image processing.

In addition to the advantages of the first and second embodiments, the third embodiment has the advantages described below.

(1) Since a plurality of computers 3 are used for distributed processing, the speed of the rendering process is increased. For example, a new exfoliated picture UP1 including overlaid relation information is directly displayed on the monitor 4, thereby easily ensuring the real time quality of the new exfoliated picture UP1.

(2) Since a plurality of computers 3 are used for distributed processing, there is a reduction in the memory resources used in the exfoliated picture storage unit UF and the relation information storage unit DI.

It should be apparent to those skilled in the art that the present invention may be embodied in many other specific forms without departing from the spirit or scope of the invention. Particularly, it should be understood that the invention may be embodied in the following forms.

In the first embodiment, the direction caption D, which indicates top, bottom, left, and right in the original cross-section image OR1, is displayed on the new exfoliated picture UP1. Alternatively, when displaying an image captured from a diagonal direction as in angiographic imaging, the image display device 1 also may display direction captions representing diagonal directions. That is, directions indicated by relation information (direction captions) may be selected as required.

In the first embodiment, both the intersection line CL and direction caption D are displayed as relation information on the new exfoliated picture UP1. Alternatively, only either the intersection line CL or the direction caption D may be displayed.

In the first embodiment, direction D is displayed as a caption. Alternatively, D can be an indicator or any kind of sign that a user can recognize.

In the second embodiment, both the indicator DN of the intersection point N and the indicator DT of the track TR are displayed as relation information on the new cross-section image OP1. Alternatively, only either the indicator DN of the intersection point N or the indicator DT of the track TR may be displayed.

In the second embodiment, relation information, which includes the intersection point N (indicator DN) of the center line CP and cross-section 42 and the track TR (indicator DT) of the center line CP, is calculated based on position data of the center line CP that intersects the cross-section 42. In this case, the relation information may also be calculated based on position data of the hypothetical cylinder 40, which intersects the cross-section 42. Relation information may also be calculated based on position data of the center line CP, which intersects the cross-section 42, and position data of the hypothetical cylinder 40, which intersects the cross-section 42.

In the second embodiment, the indicator DN of the intersection point N is represented by a crossed mark. However, the indicator DN may be represented by a mark other than a cross insofar as the mark is shaped to allow the intersection point N to be visually confirmed.

In the first embodiment, both the intersection line CL and the direction caption D are displayed as relation information on the new exfoliated picture UP1, and in the second embodiment, both the indicator DN of the intersection point N and the indicator DT of the track TR are displayed as relation information on the new cross-section image OP1. The new exfoliated picture UP1 of the first embodiment and the new cross-section image OP1 of the second embodiment may also be combined. That is, the new exfoliated picture UP1, which displays the intersection line CL and the direction caption D, and the new cross-section image OP1, which displays the indicator DN of the intersection point N and the indicator DT of the track TR may also be displayed side by side on the screen 4a of the monitor 4. Consequently, the user may more easily associate the new exfoliated picture UP1 and new cross-section image OP1, and more easily and intuitively comprehend the viewing position and viewing direction of the tubular tissue T.

The user may select with the keyboard 5 or the mouse 6 the necessary relation information from the intersection line CL, direction caption D, indicator DN of the intersection point N, and indicator DT of the track TR. As a result, an image can be obtained that displays only the relation information desired by the user, and is consequently easy to see.

The image display device 1 may, at fixed time intervals, switch the displays of the intersection line CL, direction caption D, indicator DN of the intersection point N, and indicator DT of the track TR. As a result, an image can be obtained in which the new exfoliated picture UP1 and new cross-section image OP1 are easily associated and easy to see.

In the third embodiment, network distributed processing is performed by the workstations WS1 and WS2 connected to the network. Alternatively, a single computer provided with multiple processor chips also may perform distributed processing.

In the third embodiment, three examples of a distributed rendering process are described. As another example, the rendering process of the original exfoliated picture UR1 and original cross-section image OR1 may be divided for each line (scan line of the monitor 4).

Figure 20:
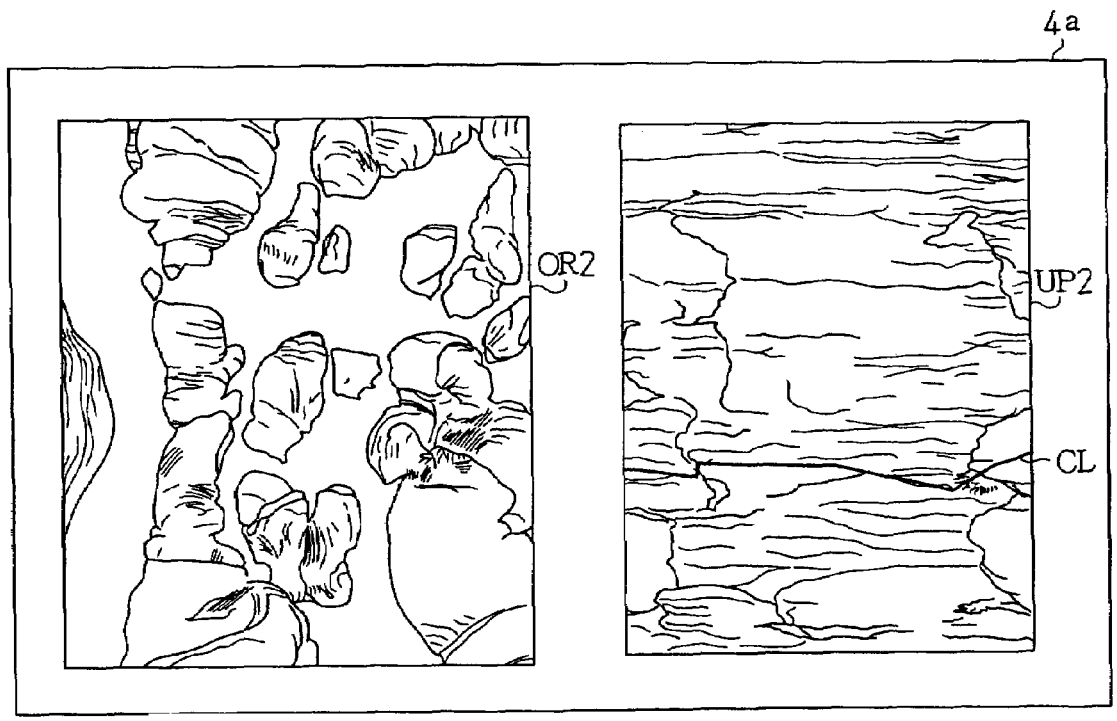
FIG. 20 is a diagram showing an original cross-section image and a new exfoliated picture according to another embodiment of the present invention.

In each of the above embodiments, the original cross-section image OR1 may be any planar cross-section including the perspective projective image P2 of the tubular tissue T. The image need not be a plane, and may also be a surface resulting from the extraction of a region of a masked three-dimensional shape, such as an organ, sphere, or column, that is, a cross-section of any shape, as shown in FIG. 20. Furthermore, the cross-section of a shape may also be a plurality of cross-sections, such as an extracted region interface or masked interface.

Since the relation information (intersection line CL) is displayed, for example, on the new exfoliated picture UP2 as shown in FIG. 20, the user can intuitively understand the correspondence between the original cross-section image OR2 and the new exfoliated picture UP2.

In each of the above embodiments, the original cross-section image OR1 is a planar cross-section, which includes the perspective projective image P2 of the tubular tissue T. Alternatively, the new cross-section image OP2 may be generated by synthesizing relation information on an original cross-section image generated by multi planar reconstruction (MPR), as shown in FIG. 15. MPR is a method for extracting and displaying a cross-section from three-dimensional image data (voxel data VD). For example, from a plurality of slice images imaged in transverse cross-section (CT images), MPR may restructure a different planar cross-section slice image.

In this case, since the relation information (intersection line CL) is displayed, for example, on the new exfoliated picture UP2, as shown in FIG. 20, the new cross-section image OP2 and the new exfoliated picture UP2 are easily associated. Furthermore, since the indicator DN of the intersection point N and the indicator DT of the track TR are displayed as shown in FIG. 15, the user easily and intuitively comprehends the position and direction of the tubular tissue T displayed as the new exfoliated picture UP2 on the new cross-section image OP2.

Figure 21:
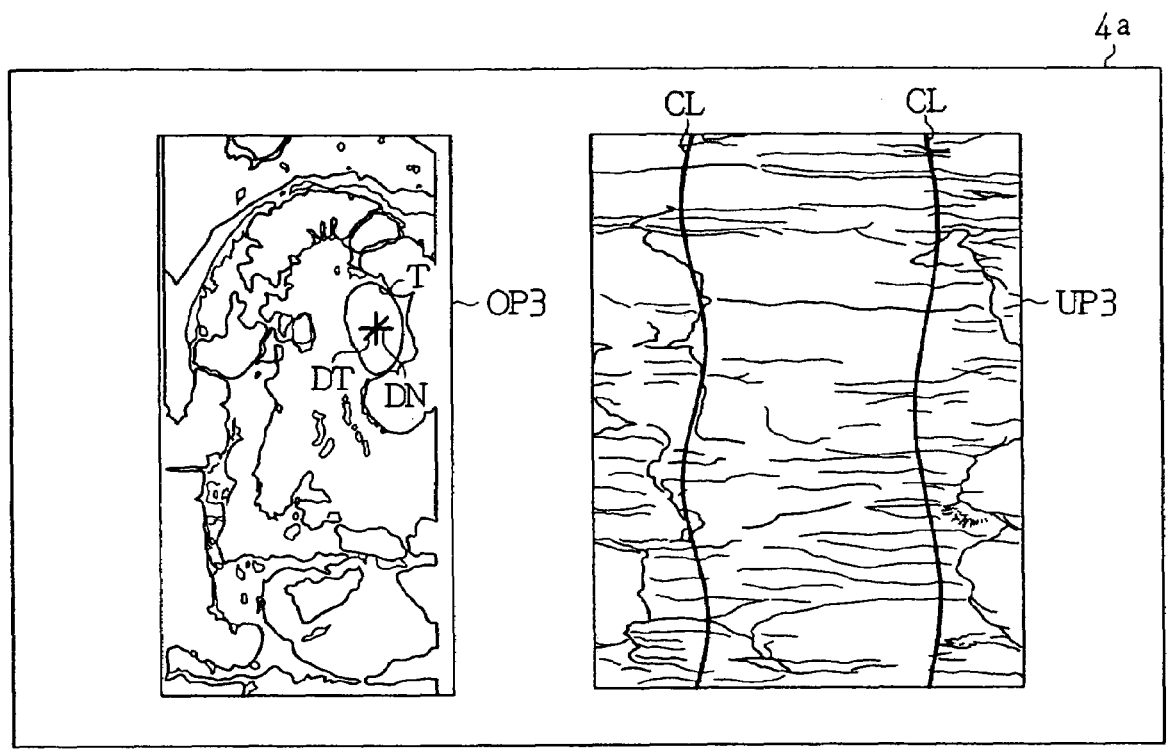
FIG. 21 is a schematic diagram showing an original cross-section image and a new exfoliated picture according to a further embodiment of the present invention.

In each of the above embodiments, the original cross-section image OR1 is a planar cross-section including the perspective projective image P2 of the tubular tissue T. Alternatively, the new cross-section image OP3, as shown in FIG. 21, may be generated by synthesizing relation information in an original cross-section image generated by curved multi planar reconstruction (CPR). CPR is a method for extracting and displaying a curved cross-section from three-dimensional image data (voxel data VD). To display thin tubular tissue T, such as blood vessels and the like, along its curve, CPR extracts and displays a curved cross-section.

Since the relation information (intersection line CL) is displayed on, for example, the new exfoliated picture UP3 shown in FIG. 20, the new cross-section image OP3 and the new exfoliated picture UP3 are easily associated. Furthermore, since the indicator DN of the intersection point N and the indicator DT of the track TR are displayed as shown in FIG. 21, the user easily and intuitively comprehends the position of the tubular tissue T displayed as the new exfoliated picture UP3 on the new cross-section image OP3.

In each of the above embodiments, the original cross-section image OR1 is a planar cross-section which includes the perspective projective image P2 of the tubular tissue T. Alternatively, the original cross-section image OR1 may be a cross-section which includes a parallel projection image of the tubular tissue T.

In each of the embodiments, the hypothetical cylinder 40 is a hypothetical cylinder with the center line CP at its center and having a constant value radius specified by the application. Alternatively, the hypothetical cylinder 40 may be a hypothetical cylinder with the center line CP at its center and having a user specified radius. That is, the user may also specify the radius of the hypothetical cylinder 40 using the keyboard 5 or mouse 6.

Alternatively, the tubular tissue T itself may be used as the hypothetical cylinder 40.

Alternatively, the hypothetical cylinder 40 may be formed by combining a plurality of hypothetical cylinders. For example, such a hypothetical cylinder 40 may be arranged to enclose a plurality of tubular tissues T.

Alternatively, the hypothetical cylinder 40 need not be straight. For example, when the center line CP is curved, the hypothetical cylinder 40 may also be curved along the center line CP.

Alternatively, the radius of the hypothetical cylinder 40 need not be a constant value, and may vary in accordance with the radius of the tubular tissue T.

Alternatively, the hypothetical cylinder 40 need not be centered on the center line CP. For example, the center of the hypothetical cylinder 40 may be at some distance from the center line CP in accordance with the radius of the tubular tissue T.

Alternatively, the hypothetical cylinder 40 may have a thickness. Since, in this case, a line having thickness may represent the intersection line of the cross-section 42 and the hypothetical cylinder 40, when the hypothetical cylinder 40 is a tubular tissue T, for example, change in the internal diameter of the tubular tissue T may be represented on the new exfoliated picture. Consequently, the new exfoliated picture and the new cross-section image may be more easily and intuitively associated.

Alternatively, the hypothetical cylinder 40 may be a surface obtained by image extraction of the surface configuration of an internal organ. This shows the correspondence between a surface of the internal organ and a cross-section of the internal organ.

Alternatively, a plurality of hypothetical cylinders 40 may be used. In this case, the user can easily and intuitively associate the original exfoliated picture UR1 and the new cross-section image OP2 even when a plurality of tubular tissues T are present in the new cross-section image OP2 as shown in FIG. 15.

Each of the embodiments have been described in terms of linear rays R projected from a center line CP using cylindrical projection methods (curved cylindrical projection). Alternatively, the rays R may be curves or polygonal lines.

Each of the embodiments has been described in terms of rays R projected from a center line CP within planes perpendicular to the center line CP. Alternatively, the rays R may be projected within planes which are not perpendicular to the center line CP.

Each of the embodiments has been described in terms of a plurality of rays R extending from one point on the center line CP within the same plane. Alternatively, a plurality of rays R may extend from one point on the center line CP within a plurality of planes.

Each of the embodiments has been described in terms of rays R projected from a center line CP by a cylindrical projection method (curved cylindrical projection). Alternatively, the rays R may be projected from one or more points near the center line CP.

In each of the embodiments, the original exfoliated picture UR1 and original cross-section images OR1 and OR2 are created by volume rendering. Alternatively, the original exfoliated picture UR1 and original cross-section images OR1 and OR2 may be created by surface rendering. Furthermore, the original exfoliated picture UR1 and original cross-section images OR1 and OR2 may be generated by combining volume rendering and surface rendering.

In each of the above embodiments, three-dimensional data is subjected to a relation information calculation process. Alternatively, data of four or more dimensions may be subjected to a relation information calculation process.

In each of the embodiments, a CT image of part of a human body such as a bone, an internal organ, or the like, is subjected to a rendering process. However, the objects included in the image are not limited to the tissue of living organisms such as humans, animals or plants insofar as the object is susceptible to CT imaging. For example, the present invention is applicable to geologic survey, mineral survey, visualization of structural fabric of machinery, imaging for viewing electrical circuit patterns, and LSI diagnostics.

In each embodiment, a CT image of parts of the human body, such as bone and internal organs, is subjected to a rendering process to visualize the relation information. The present invention is also applicable to visualization of results of computer-assisted engineering systems and scientific computations.

The present examples and embodiments are to be considered as illustrative and not restrictive and the invention is not to be limited to the details given herein, but may be modified within the scope and equivalence of the appended claims.

What is claimed is:

1. A method for performing rendering using image data of three or more dimensions including a plurality of voxels of three or more dimensions, the method comprising:
    preparing an exfoliated picture generated by projecting voxels using cylindrical projection method with a center line;
    preparing position data of a cross-section and a cross-section image representing the cross-section of the image data;
    creating a hypothetical cylinder including position data using the center line;
    calculating relation information associating the hypothetical cylinder and the cross-section using position data of the hypothetical cylinder and position data of the cross-section; and
    synthesizing the relation information with at least one of the exfoliated picture and the cross-section image to generate a synthesized image.

2. The method for performing rendering according to claim 1, wherein:
    the position data is coordinate data in a Cartesian coordinate system for voxels; and
    said calculating relation information includes calculating the relation information using coordinate data of the Cartesian coordinate system.

3. The method for performing rendering according to claim 1, wherein said synthesizing the relation information with at least one of the exfoliated picture and the cross-section image includes visualizing the relation information.

4. The method for performing rendering according to claim 1, wherein the cross-section is obtained by extracting at least part of the image data.

5. The method for performing rendering according to claim 1, wherein the cross-section is a planar cross-section.

6. The method for performing rendering according to claim 1, wherein the cross-section is a curved cross-section.

7. The method for performing rendering according to claim 1, wherein the cross-section is a planar cross-section including a perspective projective image.

8. The method for performing rendering according to claim 1, wherein at least one of the exfoliated picture and the cross-section image is generated by volume rendering.

9. The method for performing rendering according to claim 1, wherein at least one of the exfoliated picture and the cross-section image is generated by surface rendering.

10. The method for performing rendering according to claim 1, wherein the image data includes image data of a tubular structure.

11. A method for performing rendering using image data of three or more dimensions including a plurality of voxels of three or more dimensions, the method comprising:
    preparing an exfoliated picture generated by projecting voxels using cylindrical projection method with a center line;
    preparing a cross-section image representing a cross-section of the image data;
    creating a hypothetical cylinder that intersects the cross-section using the center line;
    calculating relation information representing the position of the cross-section using position data of voxels existing in an intersection of the cross-section and the hypothetical cylinder; and
    synthesizing the relation information and the exfoliated picture to generate a synthesized image.

12. The method for performing rendering according to claim 11, wherein the relation information represents a line of intersection of the hypothetical cylinder and the cross-section.

13. The method for performing rendering according to claim 11, wherein the relation information represents a direction on the cross-section image.

14. A method for performing rendering using image data of three or more dimensions including a plurality of voxels of three or more dimensions, wherein the voxels include position data, the method comprising:
    preparing an exfoliated picture generated by projecting voxels using cylindrical projection method with a center line;
    preparing a cross-section image representing a cross-section of the image data;
    creating a hypothetical cylinder that intersects the cross-section using the plurality of voxels;
    calculating relation information representing the position of several voxels on the cross-section image using the position data of voxels existing in an intersection of the cross-section with at least one of the hypothetical cylinder and center line of the hypothetical cylinder; and
    synthesizing the relation information and cross-section image to generate a synthesized image.

15. The method for performing rendering according to claim 14, wherein the relation information represents an intersection point of the cross-section and the center line of the hypothetical cylinder.

16. The method for performing rendering according to claim 14, wherein the relation information represents a track of the center line of the hypothetical cylinder.

17. A computer readable program product comprising computer readable media storing program code for performing rendering using image data of three or more dimensions including a plurality of voxels of three or more dimensions, wherein the program code when executed by at least one computer performs steps including:
   preparing an exfoliated picture generated by projecting voxels using cylindrical projection method with a center line;
   preparing position data of a cross-section and a cross-section image representing the cross-section of the image data;
   creating a hypothetical cylinder including position data using the center line;
   calculating relation information associating the hypothetical cylinder and the cross-section using position data of the hypothetical cylinder and position data of the cross-section; and
   synthesizing the relation information with at least one of the exfoliated picture and the cross-section image to generate a synthesized image.

18. The computer readable program product according to claim 17, wherein:
   the position data is coordinate data in a Cartesian coordinate system for voxels; and
   said calculating relation information includes calculating the relation information using coordinate data of the Cartesian coordinate system.

19. The computer readable program product according to claim 17, wherein said synthesizing the relation information with at least one of the exfoliated picture and the cross-section image includes visualizing the relation information.

20. The computer readable program product according to claim 17, wherein the cross-section is obtained by extracting at least part of the image data.

21. The computer readable program product according to claim 17, wherein the cross-section is a planar cross-section.

22. The computer readable program product according to claim 17, wherein the cross-section is a curved cross-section.

23. The computer readable program product according to claim 17, wherein the cross-section is a planar cross-section including a perspective projective image.

24. The computer readable program product according to claim 17, wherein at least one of the exfoliated picture and the cross-section image is generated by volume rendering.

25. The computer readable program product according to claim 17, wherein at least one of the exfoliated picture and the cross-section image is generated by surface rendering.

26. The computer readable program product according to claim 17, wherein the image data includes image data of a tubular structure.

27. A computer readable program product comprising computer readable media storing program code for performing rendering using image data of three or more dimensions including a plurality of voxels of three or more dimensions, wherein the program code when executed by at least one computer performs steps including:
   preparing an exfoliated picture generated by projecting voxels using cylindrical projection method with a center line;
   preparing a cross-section image representing a cross-section of the image data;
   creating a hypothetical cylinder that intersects the cross-section using the center line;
   calculating relation information representing the position of the cross-section using position data of voxels existing in an intersection of the cross-section and the hypothetical cylinder; and
   synthesizing the relation information and the exfoliated picture to generate a synthesized image.

28. The computer readable program product according to claim 27, wherein the relation information represents a line of intersection of the hypothetical cylinder and the cross-section.

29. The computer readable program product according to claim 27, wherein the relation information represents a direction on the cross-section image.

30. A computer readable program product comprising computer readable media storing program code for performing rendering using image data of three or more dimensions including a plurality of voxels of three or more dimensions, wherein the voxels include position data, the program code when executed by at least one computer performs steps including:
   preparing an exfoliated picture generated by projecting voxels using cylindrical projection method with a center line;
   preparing a cross-section image representing a cross-section of the image data;
   creating a hypothetical cylinder that intersects the cross-section using the plurality of voxels;
   calculating relation information representing the position of several voxels on the cross-section image using the position data of voxels existing in an intersection of the cross-section with at least one of the hypothetical cylinder and center line of the hypothetical cylinder; and
   synthesizing the relation information and cross-section image to generate a synthesized image.

31. The computer readable program product according to claim 30, wherein the relation information represents an intersection point of the cross-section and the center line of the hypothetical cylinder.

32. The computer readable program product according to claim 30, wherein the relation information represents a track of the center line of the hypothetical cylinder.

33. An apparatus for performing rendering using image data of three or more dimensions including a plurality of voxels of three or more dimensions, wherein an exfoliated picture is generated by projecting voxels using cylindrical projection method with a center line, and a cross-section image represents a cross-section of the image data, the apparatus comprising:
   a hypothetical cylinder generation unit for creating a hypothetical cylinder including position data using the center line;
   a relation information calculation unit for calculating relation information associating the hypothetical cylinder and the cross-section using position data of the cross-section and position data of the hypothetical cylinder; and
   a synthesis unit for synthesizing the relation information with at least one of the exfoliated picture and cross-section image to generate a synthesized image.

34. The apparatus for performing rendering according to claim 33, wherein:
   the position data is coordinate data in a Cartesian coordinate system for voxels; and the relation information calculation unit calculates the relation information using coordinate data of the Cartesian coordinate system.

35. The apparatus for performing rendering according to claim 33, wherein the synthesis unit visualizes the relation information.

36. The apparatus for performing rendering according to claim 33, wherein at least one of the relation information calculation unit and the synthesis unit is a central processing unit.

37. An apparatus for performing rendering using image data of three or more dimensions including a plurality of voxels of three or more dimensions, wherein each of the voxels includes position data, an exfoliated picture is generated by projecting voxels using cylindrical projection method with a center line, and a cross-section image represents a cross-section of the image data, the apparatus comprising:
 a hypothetical cylinder generation unit for creating a hypothetical cylinder that intersects the cross-section using the center line;
 a relation information calculation unit for calculating relation information representing a position on the cross-section image using the position data of voxels existing in an intersection of the cross-section and the hypothetical cylinder; and
 a synthesis unit for synthesizing the relation information and exfoliated picture to generate a synthesized image.

38. An apparatus for performing rendering using image data of three or more dimensions including a plurality of voxels of three or more dimensions, wherein the voxels include position data, an exfoliated picture is generated by projecting voxels using cylindrical projection method with a center line, and a cross-section image represents a cross-section of the image data, the apparatus comprising:
 a hypothetical cylinder generation unit for creating a hypothetical cylinder using several voxels;
 a relation information calculation unit for calculating relation information representing the position of voxels on the cross-section image using the position data of the voxels existing in an intersection of the cross-section with at least one of the hypothetical cylinder and a center line of the hypothetical cylinder; and
 a synthesis unit for synthesizing the relation information and cross-section image.

* * * * *